(12) United States Patent
O'Connor et al.

(10) Patent No.: US 12,452,124 B2
(45) Date of Patent: *Oct. 21, 2025

(54) METHOD AND APPARATUS FOR CONTROLLING ELECTRONIC DEVICES

(71) Applicant: Granite Telecommunications, LLC, Quincy, MA (US)

(72) Inventors: Brian O'Connor, Easton, MA (US); Adam Weiner, Quincy, MA (US)

(73) Assignee: Granite Telecommunications, LLC, Quincy, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,464

(22) Filed: Mar. 27, 2024

(65) Prior Publication Data

US 2024/0235924 A1 Jul. 11, 2024

Related U.S. Application Data

(63) Continuation of application No. 18/079,560, filed on Dec. 12, 2022, now Pat. No. 11,962,458.

(Continued)

(51) Int. Cl.
*H04L 41/0659* (2022.01)
*H04L 12/12* (2006.01)
(Continued)

(52) U.S. Cl.
CPC .......... *H04L 41/0661* (2023.05); *H04L 12/12* (2013.01); *H04L 43/0811* (2013.01); *H04W 76/10* (2018.02)

(58) Field of Classification Search
None
See application file for complete search history.

(56) References Cited

U.S. PATENT DOCUMENTS 6,091,956 A 7/2000 Hollenberg
7,171,461 B2 1/2007 Ewing et al.
(Continued)

FOREIGN PATENT DOCUMENTS

CA 2662168 A1 3/2008
JP 2006-339955 A 12/2006
(Continued)

OTHER PUBLICATIONS

3GStore IP Switch, Remote Power Management Solution for Crashed Network Devices, User Manual, (Apr. 3, 2013).

(Continued)

*Primary Examiner* — Mohamed Ibrahim
(74) *Attorney, Agent, or Firm* — Hamilton, Brook, Smith & Reynolds, P.C.

(57) ABSTRACT

Embodiments include apparatuses for rebooting an electronic device. In an embodiment, an apparatus includes a data interface, a first power port, a second power port, a switch, and a processor. The data interface is configured to connect to the electronic device. The first power port is configured to receive power from a power source and the second power port is configured to deliver power to the electronic device. The switch is configured to connect the first power port to the second power port. The processor conducts data communications monitoring of the electronic device via the data interface and reboots the electronic device responsive to the data communications monitoring.

22 Claims, 15 Drawing Sheets

Related U.S. Application Data

(60) Provisional application No. 63/371,181, filed on Aug. 11, 2022.

(51) Int. Cl.
*H04L 43/0811* (2022.01)
*H04W 76/10* (2018.01)

(56) References Cited

U.S. PATENT DOCUMENTS

| | | | |
|---|---|---|---|
| 7,271,502 | B1 | 9/2007 | Remaker |
| 8,046,619 | B2 | 10/2011 | Newland et al. |
| 8,181,043 | B1 | 5/2012 | Reynolds |
| 8,365,018 | B2 | 1/2013 | Mcintosh et al. |
| 8,559,996 | B2 | 10/2013 | Lehr et al. |
| 8,793,364 | B1 | 7/2014 | Barkelew et al. |
| 9,531,550 | B2 | 12/2016 | Jabbaz et al. |
| 10,404,559 | B2 | 9/2019 | Weiss et al. |
| 11,218,425 | B2 | 1/2022 | Charette |
| 11,876,734 | B2 | 1/2024 | Charette |
| 11,962,458 | B2 | 4/2024 | O'Connor et al. |
| 2005/0206241 | A1 | 9/2005 | Saxena et al. |
| 2005/0257041 | A1* | 11/2005 | Wallenstein .......... G06F 21/575 713/2 |
| 2006/0072531 | A1 | 4/2006 | Ewing et al. |
| 2007/0198748 | A1 | 8/2007 | Ametsitsi et al. |
| 2009/0013210 | A1 | 1/2009 | Mcintosh et al. |
| 2009/0251127 | A1 | 10/2009 | Kim |
| 2010/0102631 | A1 | 4/2010 | Chiou |
| 2011/0035624 | A1 | 2/2011 | Miller |
| 2014/0122140 | A1* | 5/2014 | Rijnders .......... G06Q 30/01 705/7.13 |
| 2014/0204504 | A1 | 7/2014 | Ewing et al. |
| 2014/0240902 | A1 | 8/2014 | Burch |
| 2014/0266767 | A1 | 9/2014 | Huang et al. |
| 2014/0304534 | A1 | 10/2014 | Ewing et al. |
| 2015/0130276 | A1 | 5/2015 | Mcneill-Mccallum et al. |
| 2017/0019294 | A1* | 1/2017 | Weiss .......... H04L 43/0817 |
| 2017/0235351 | A1 | 8/2017 | Zhou et al. |
| 2018/0062815 | A1 | 3/2018 | Mitchell et al. |
| 2019/0123955 | A1 | 4/2019 | Chan et al. |
| 2021/0081024 | A1* | 3/2021 | Wu .......... G06F 13/385 |
| 2021/0320871 | A1* | 10/2021 | Savarese .......... G06N 20/00 |
| 2021/0377101 | A1 | 12/2021 | Hieb |
| 2022/0052966 | A1 | 2/2022 | Charette |
| 2024/0015116 | A1 | 1/2024 | Charette |
| 2024/0056349 | A1 | 2/2024 | O'Connor et al. |

FOREIGN PATENT DOCUMENTS

| | | | |
|---|---|---|---|
| WO | 2018/122577 | A1 | 7/2018 |
| WO | 2024/036043 | A1 | 2/2024 |

OTHER PUBLICATIONS

5Gstore Remote Power Switch—2 Outlets—Remote Automation and Remote Rebooting—App Controlled. https://5gstore.com/product/8897_5gstore_remote_power_switch_-_2_outlets_-_remote_automation_and_remote_rebooting_-_app_controlled.html Downloaded from Internet Feb. 6, 2023.

Dataprobe Inc., iBootBar Installation and Operations Version 1.20, 2008, 24 pages.

Dataprobe, "iBoot-DC—Web Power Switch—DC Powered"—https://dataprobe.com/iboot-dc/ Downloaded from Internet Feb. 6, 2023.

iBoot—Web Power Switch Dataprobe—Network Reliability. 12 pages. https://dataprobe.com/iboot/—Downloaded from Internet Dec. 20, 2022.

International Search Report and Written Opinion received for PCT Patent Application No. PCT/US2023/071082, mailed on Oct. 23, 2023, 25 pages.

Internet Enabled Cellular L TE Controlled Power Outlet & Power Outage Monitoring—https://logmor.com/product/cellular-lte-controled-power-outlet-control-devices-remotely/ Downloaded from Internet May 1, 2023.

NetDefib—Product Summary, downloaded Feb. 21, 2024, https://web.archive.org/web/20151230073336/http://netdefib.com/netdefib-summary.htm, 2 pages.

NetDefib—Specifications, downloaded Feb. 21, 2024, https://web.archive.org/web/20151229174047/http://netdefib.com/netdefib-specifications.htm, 1 page.

Network Computing—Network Infrastructure—Gratifying Gadgets, downloaded Feb. 21, 2024, https://web.archive.org/web/20061105020842/http://networkcomputing.com:80/showitem.jhtml?articleID=53700318&pgno=7, 1 page.

VENTUS, Global Network solution, VRB842 Combines 4G LTE-A with Remote Power Reboot, Router, 2020, 2 pages.

* cited by examiner

METHOD AND APPARATUS FOR CONTROLLING ELECTRONIC DEVICES

RELATED APPLICATIONS

This application is a continuation of U.S. application Ser. No. 18/079,560, filed on Dec. 12, 2022, which claims the benefit of U.S. Provisional Application No. 63/371,181, filed on Aug. 11, 2022. The entire teachings of the above applications are incorporated herein by reference.

BACKGROUND

Customers of telecommunications service providers have come to expect nearly 100% uptime, even with high-speed data circuits. Half of the issues reported for broadband circuits are resolved by rebooting a device, e.g., a modem. About 20% of the support time provided by a telecommunications service provider is spent working with on-site customer resources trying to reboot a device, which interrupts the customer and their business. If the customer is unavailable, this can lead to escalations and trouble tickets pending, dramatically increasing mean time to repair (MTTR).

SUMMARY

The present disclosure describes an approach that addresses the problems noted above by providing for automated reboot of customer devices. A power cycle controller, co-located with one or more customer devices, under the control of a remote cloud-based management system, monitors internet connectivity and, upon a determination that connectivity is lost, automatically reboots the one or more customer devices. The automated reboot can operate in scenarios that include loss of internet connectivity, extreme packet loss, and scheduled reboots. In the event that the power cycle controller itself fails, power continues to pass through the power cycle controller to keep power to customer devices.

The power cycle controller includes remote cellular connectivity, as well as the ability to utilize a wireline connection, to ensure high availability and out-of-band access to monitor devices.

An example embodiment is directed to an apparatus for rebooting an electronic device. The apparatus includes a data interface, a first power port, a second power port, a switch, and a processor. The data interface is configured to connect to the electronic device. The first power port is configured to receive power from a power source and the second power port is configured to deliver power to the electronic device. The switch is configured to connect the first power port to the second power port. The processor conducts data communications monitoring of the electronic device via the data interface and reboots the electronic device responsive to the data communications monitoring.

According to an aspect, the data interface is configured to connect to the electronic device via at least one of an Ethernet connection and a WiFi connection.

The electronic device can be a first electronic device and the apparatus may further include a communication interface configured to connect the apparatus to a control-device communicatively coupled to a second electronic device. The processor may be further configured to send a command to the control-device and receive data from the control-device. Further, according to yet another embodiment, the control-device is configured to perform one or more control operations of the second electronic device.

In an example embodiment, the processor is configured to reboot the electronic device by opening the switch connecting the first power port to the second power port and closing the switch following a backoff period.

The monitored and rebooted electronic device may be any electronic device known in the art. For instance, the electronic device may be a modem, a router, a switch, a point-of-sale (POS) system, a server, an environment monitoring system (EMS), a network interface device (NID), a computing device, a software-defined wide area network (SDWAN) appliance, or an antenna, among other examples. According to an aspect, the router may be a wireless router or a wired router, or any other router known in the art. In an implementation, the NID may be a carrier NID. According to an embodiment, the antenna may be an external antenna.

The data communications monitoring can include testing at least one of access to an Internet server, access to a Domain Name System (DNS) server, accessing a Uniform Resource Locator (URL), making an application programming interface (API) call, receiving an API call, sending data via an Internet protocol, and receiving data via an Internet protocol.

The data communications monitoring may include testing connectivity through the electronic device to a network point. In an embodiment, the processor is configured to reboot the electronic device responsive to the data communications monitoring detecting a failure condition in the connectivity through the electronic device to the network point. According to an example embodiment, the data communications monitoring is configurable. In yet another embodiment, the processor is further configured to reboot the electronic device in accordance with a user specified condition. Thus, such an embodiment may reboot the electronic device without considering data communications monitoring. For example, such an embodiment may reboot the electronic device in accordance with a schedule or responsive to a user command, among other examples. Moreover, the processor may be configured to reboot the electronic device responsive to the data communications monitoring identifying existence of a user specified condition, e.g., a data communications condition or other such condition.

The apparatus may further include a cellular interface configured to connect the apparatus to a cloud management system. In an implementation, the processor is further configured to track reboot information for reporting via the cellular interface to the cloud management system. Further, according to another aspect, the cellular interface is configured to enable Long-Term Evolution (LTE) communications between the apparatus and the cloud management system.

Further, according to yet another embodiment, the electronic device is a first electronic device, the data interface is a first data interface, and the switch is a first switch. In one such embodiment, the apparatus further includes a second data interface, a third power port, and a second switch. The second data interface is configured to connect to a second electronic device and the third power port is configured to deliver power to the second electronic device. The second switch is configured to connect the first power port to the third power port. According to one such embodiment, the processor is configured to (i) conduct data communications monitoring of the second electronic device via the second data interface and (ii) reboot the second electronic device responsive to the data communications monitoring of the second electronic device. In an example embodiment, the reboot of the second electronic device is independent of the reboot of the first electronic device.

Another example embodiment is directed to an apparatus for controlling an electronic device. The apparatus includes a cellular interface, a data interface, and a processor. The cellular interface is configured to connect the apparatus to a cloud management system and the data interface is configured to connect to the electronic device. The processor is configured to perform one or more control operations of the electronic device. In an implementation, the cellular interface can establish any cellular connection known in the art, such as a LTE connection.

Further, according to yet another example embodiment, the one or more control operations may include at least one of executing a script, a reboot, reporting to the cloud management system, taking any preprogrammed action, and sending an impulse to the electronic device. According to an aspect, the impulse may be logical or electrical, and may further be based on a departure from one or more predetermined conditions.

In an embodiment, the processor is further configured to receive an indication of the one or more control operations via the cloud management system. In response to the received indication, the processor performs the one or more control operations. According to another embodiment, the indication of the one or more control operations is provided by a user via the cloud management system. In yet another embodiment, the processor is further configured to monitor the electronic device via the data interface and perform the one or more control operations responsive to the monitoring.

An example embodiment is directed to a method for rebooting an electronic device. The method establishes a communication connection to the electronic device and conducts data communications monitoring of the electronic device via the established communication connection. Responsive to the data communications monitoring, the method reboots the electronic device.

Another example embodiment is directed to a method for controlling an electronic device. A cellular communication connection to a cloud management system is established. The method then communicates with the electronic device and performs one or more control operations of the electronic device.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

As described above, telecommunications users expect nearly 100% uptime, even with high-speed data circuits. Despite the desire for 100% uptime, various issues often occur that disrupt connectivity. These issues can frequently be remedied by rebooting a device, e.g., a modem. However, existing technology typically requires user intervention to perform reboots and this user intervention is often accompanied by provider service calls and intervention. Embodiments solve these problems and provide functionality to automatically reboot and perform control operations on electronic devices. In some embodiments, an "out-of-band" (OOB) connection is provided for communicating with electronic devices. The OOB connection may be a cellular connection, such as a LTE connection, or any other connection known in the art. Using the OOB connection allows for communications with and control of electronic devices even when other data connectivity to the devices is disrupted.

Figure 1:
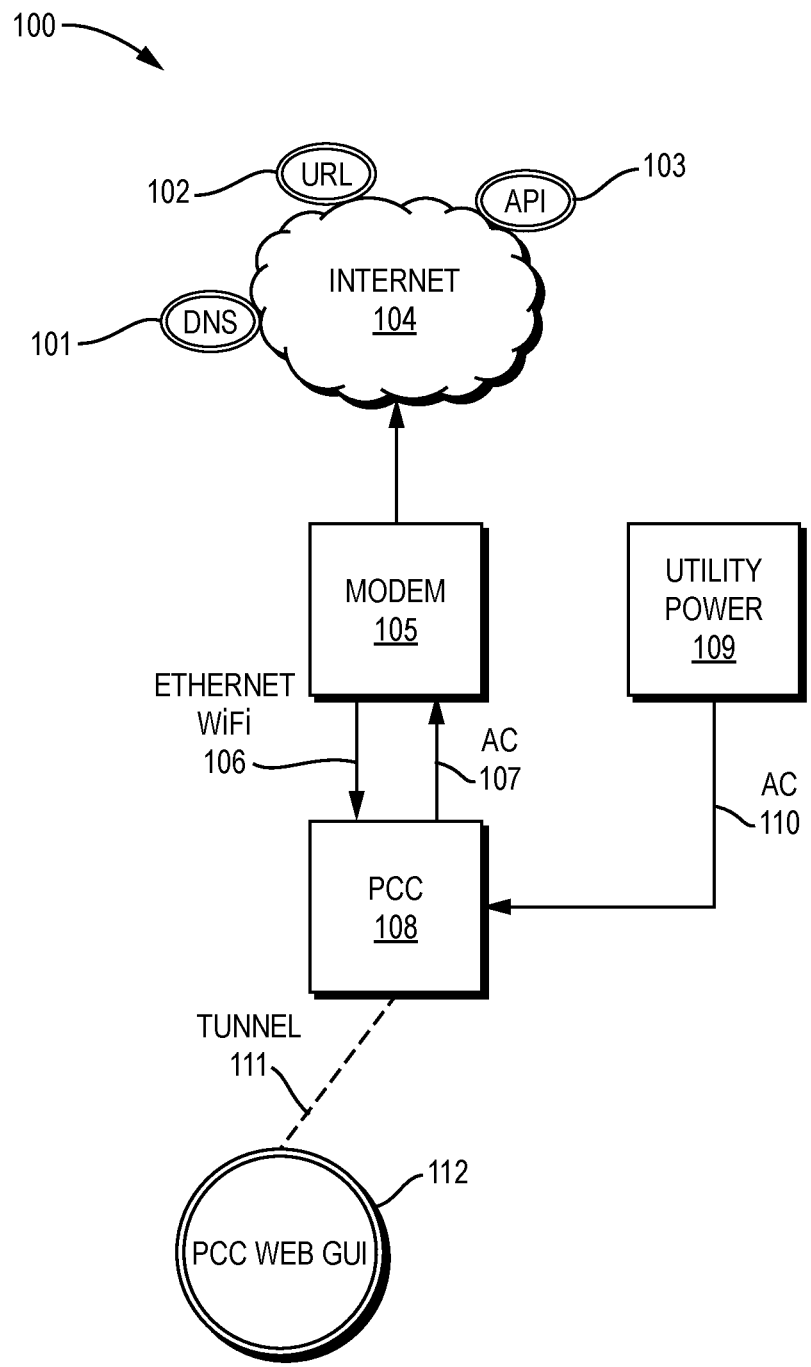
FIG. 1 is a simplified block diagram of a system for controlling an electronic device, according to an example embodiment.

FIG. 1 is a simplified block diagram of one such example system 100 for controlling an electronic device according to an embodiment. Specifically, the system 100 includes a power cycle controller (PCC) 108 that is configured to cycle power to a modem 105. In implementations, the PCC 108 can implement the methods 220, 230, 240, 400, and/or 600, described hereinbelow in relation to FIGS. 2A, 2B, 2C, 4, and 6, respectively, to perform control operations, e.g., reboots, of the modem 105.

To provide such functionality, the PCC 108 includes (not shown) a data interface, a first power port, a second power port, a switch, and a processor. The data interface is configured to establish communication connection 106 to the modem 105. The first power port is configured to receive power from a utility power source 109 via an AC connection 110 and the second power port is configured to deliver power to the modem 105 via an AC connection 107. The switch is configured to connect the first power port to the second power port. The processor (i) conducts data communications monitoring of the modem 105 via the communication connection 106, which may be any communication connection known in the art, such as an Ethernet or WiFi connection, and (ii) reboots the modem 105 responsive to the data communications monitoring. The PCC 108 uses the communication connection 106 and the modem 105 to connect to an Internet 104 and points accessible via the Internet 104, e.g., a DNS server 101, a website URL 102, and an API 103.

It is noted that although FIG. 1 illustrates the modem 105 as an example of an electronic device, electronic devices monitored and controlled using the functionality described herein are not limited to modems. For example, in other embodiments, the electronic device may be a router, a switch, a point-of-sale (POS) system, a server, an environment monitoring system (EMS), a network interface device (NID), a computing device, a software-defined wide area network (SDWAN) appliance, and an antenna, or any other device known in the art.

In yet another embodiment, the processor of PCC 108 is further configured to reboot the electronic device 105 in accordance with a user specified condition. Thus, such an embodiment may reboot the electronic device 105 without considering data communications monitoring. For example, such an embodiment may reboot the electronic device 105 in accordance with a schedule or responsive to a user command, among other examples. Moreover, the processor may be configured to reboot the electronic device 105 responsive to the data communications monitoring identifying existence of a user specified condition. In other words, such an embodiment allows a user to indicate conditions/characteristics identified by the data communications monitoring that warrant rebooting the device 105.

According to an embodiment, the system 100 also includes an exemplary cloud management system PCC Web Graphical User Interface (GUI) 112 and a cellular connection tunnel 111. The PCC 108 may further include a cellular interface (not shown) that is configured to connect the PCC Web GUI 112 via the cellular connection 111. The cellular interface can establish any cellular connection known in the art, such as a LTE connection. In an implementation, the processor of PCC 108 is further configured to track reboot and other information for reporting via the cellular interface to the cloud management system PCC Web GUI 112. According to an embodiment, the tracked information may include status information about an apparatus, e.g., PCC 108, as well as status information about network(s), interface(s), port(s), connection(s) (e.g., communication connection 106 or cellular connection 111), and/or device(s) (e.g., modem 105) monitored by the apparatus. In an aspect, examples of tracked information may include any or all of the following:

a) Information about the number of reboots over the lifetime of the apparatus.
b) Information about the number of reboots in a user-configurable timeframe, e.g., in the last three hours.
c) Information about the number of reboots since the last system restart.
  i. According to an implementation, a system restart may be prompted by a "watchDogService" function (described in more detail hereinbelow with respect to FIG. 10) determining that no activity is occurring on a cellular connection, e.g., cellular connection 111.
d) Central processing unit (CPU) usage of the apparatus, which may be expressed as a percentage value.
e) CPU temperature of the apparatus.
f) Memory usage of the apparatus, which may be expressed as a percentage value.
g) Input/output operations per second (IOPS).
h) Uptime of the apparatus.
i) Latency between applications.
j) Jitter.
k) Version(s) of package(s) installed on the apparatus.
l) Information about a cellular connection, e.g., cellular connection 111, such as received signal strength indicator (RSSI), reference signal received quality (RSRQ), and/or signal-to-noise ratio (SNR).
m) Data throughput.

In an embodiment, reboot information, such as in items a)-c) described above, may be stored as a key/value pair data structure, where each key is associated with a particular reboot, and each value includes detailed information about that reboot. For example, a particular reboot may correspond to an action taken on an individual port, and detailed information about the reboot may include the reason for the reboot, e.g., the apparatus or a device was unresponsive, or the reboot was requested remotely.

According to an aspect, the tracked information described in the examples above may be obtained using a monitoring application locally installed on the apparatus, e.g., PCC 108. In an implementation, the monitoring application is a "watchdog" service, such as the "watchDogService" function described hereinbelow with respect to FIG. 10. According to an embodiment, the monitoring application evaluates the overall "health" of a system, which may include the status of daemons and binaries, etc., running on the apparatus, as well as the status of individual services, e.g., a network or modem manager. Furthermore, in some embodiments, the monitoring application determines the status of a steady state/reboot logic, such as logic 221 (FIG. 2A), 232 (FIG. 2B), or 242 (FIG. 2C). In an aspect, the monitoring application may individually restart any of the daemons, binaries, or individual services, etc., as well as any other application or program running on the apparatus. According to an embodiment, the monitoring application may also restart an entire system or apparatus, e.g., the PCC 108, if one or more conditions are met, such as when CPU and/or memory usage exceed a threshold.

Continuing with FIG. 1, by using the cellular connection 111 instead of relying on a connection via the Internet 104, the PCC Web GUI 112 provides out-of-band (OOB) access to and management of the device 105 via PCC 108 even when it cannot otherwise be reached through Internet 104. Moreover, the PCC Web GUI 112 allows a user to configure the data communications monitoring and other aspects of PCC 108 operation remotely, such as by adding, removing, or modifying configuration data. According to an example embodiment, the PCC 108 may include a default configuration provided for standard users. The default configuration may facilitate "plug & play" installation of the PCC 108. In one such example, the default configuration indicates settings and/or behavior for the data communications monitoring performed by the PCC 108. According to an example embodiment, the PCC 108 is configured to periodically (e.g., every 30 s) poll DNS server(s) reachable via a public network, such as the global internet, or any other network known in the art. The DNS server(s) may be specified by Internet Protocol (IP) address(es), e.g., 8.8.8.8, 8.8.4.4, 1.1.1.1, and 1.0.0.1. In one such example embodiment, the polling may include transmitting 64 kilobyte (K) packets to the server(s). According to an aspect, the default configuration may include logic such that, if polling of the DNS server(s) fails repeatedly, e.g., after ten consecutive attempts over a span of five minutes (10×30 s=300 s, i.e., 5 m), then a reboot is triggered via a power output port, e.g., AC connection 107, followed by a backoff period, e.g., 10 m. In another example embodiment, a specialized configuration may be used. The specialized configuration may be developed based on user input.

Figure 2A:
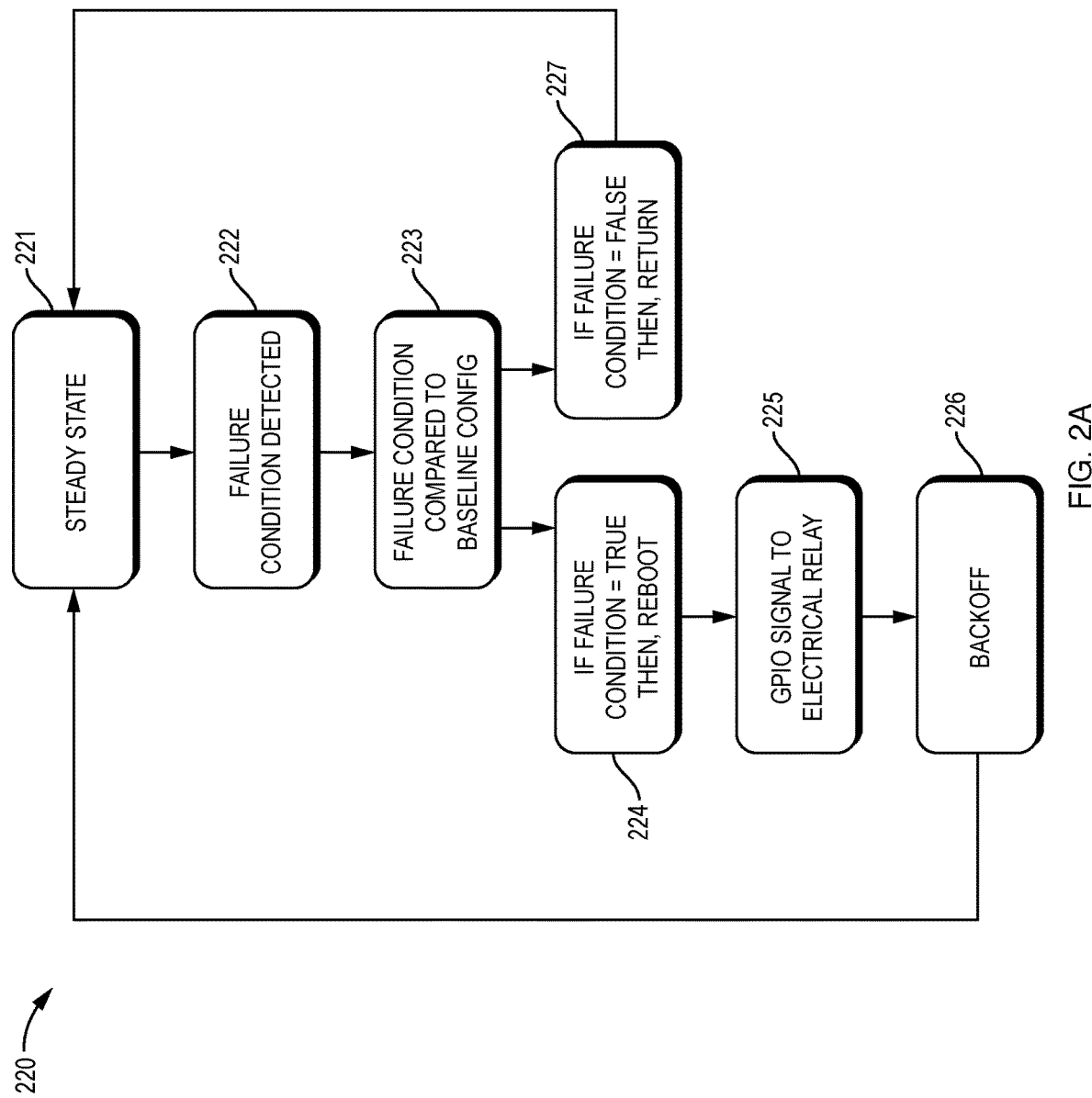
FIG. 2A is a flow diagram of a method for rebooting an electronic device.

FIG. 2A is a flow diagram of a method 220 for rebooting an electronic device.

The method 220 starts at step 221 by entering a steady state logic phase. According to an embodiment, different types of devices and/or network endpoints may be organized or grouped according to priority (P) "buckets" or tiers. In turn, the steady state logic may be separately defined or specified for each different bucket or tier. Such logic may be included as part of a default configuration for, e.g., the PCC 108 (FIG. 1), or may be user-configured. According to an implementation, an exemplary grouping of priority buckets P1/P2/P3, including types and categories of devices and/or endpoints belonging to each bucket, is described below:
  a) P1: point of sale (POS—i.e., payment processor), DNS (e.g., up/down, packet loss, latency/jitter);
  b) P2: critical (e.g., datacenters), applications;
  c) P3: general internet, scheduled reboots.

In an aspect, the separate logic for each of the above exemplary priority buckets P1/P2/P3 may be specified as follows:
  a) P1: Reboot if unable to access any network endpoints for 1 m.
  b) P2: Reboot if >=50% of network endpoints are inaccessible for 5 m.
  c) P3: Reboot if all network endpoints are inaccessible for 10 m.

As stated hereinabove, and according to an embodiment, the priority buckets may be user-configured. In an implementation, the user configuration may include modifying any variable or value in a bucket or tier, as well as assigning a network endpoint to a particular bucket or tier. According to some aspects, the separate logic for each bucket or tier may be evaluated in a systematic fashion, such as by using a dynamic decision tree, or any other technique known to those of skill in the art.

Figure 2B:
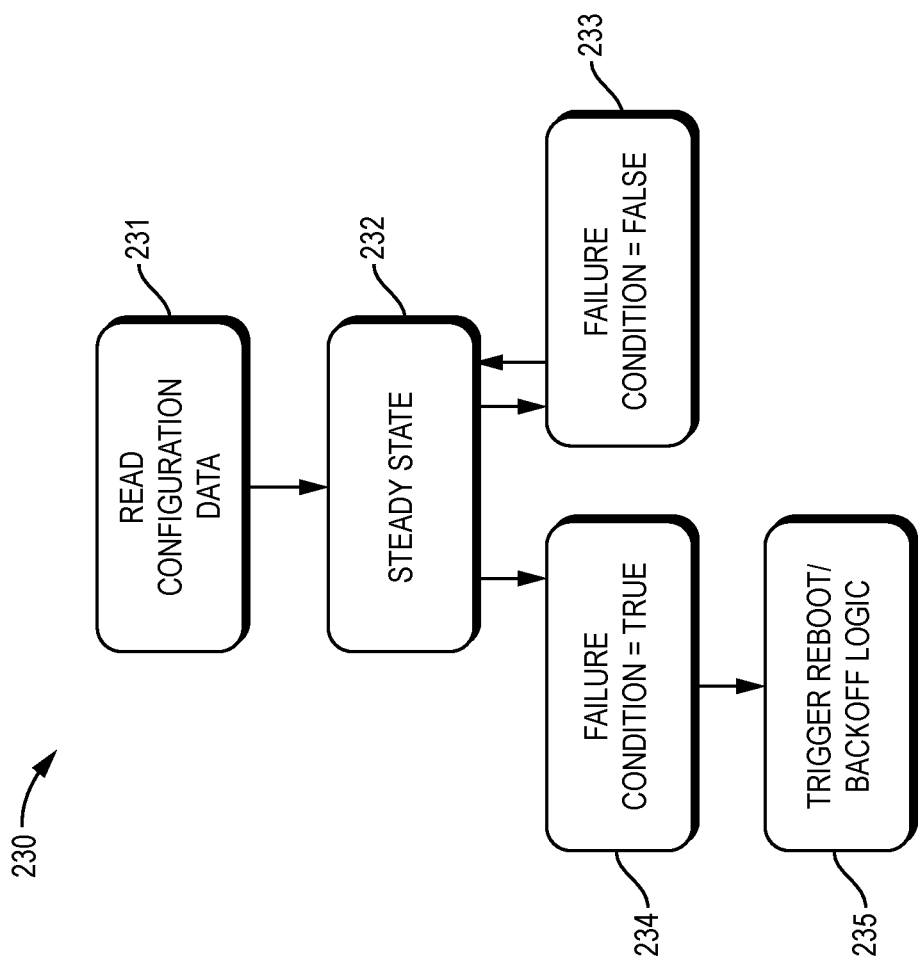
FIG. 2B is a flow diagram of a method for implementing steady state logic in relation to a method for rebooting an electronic device.
Figure 2C:
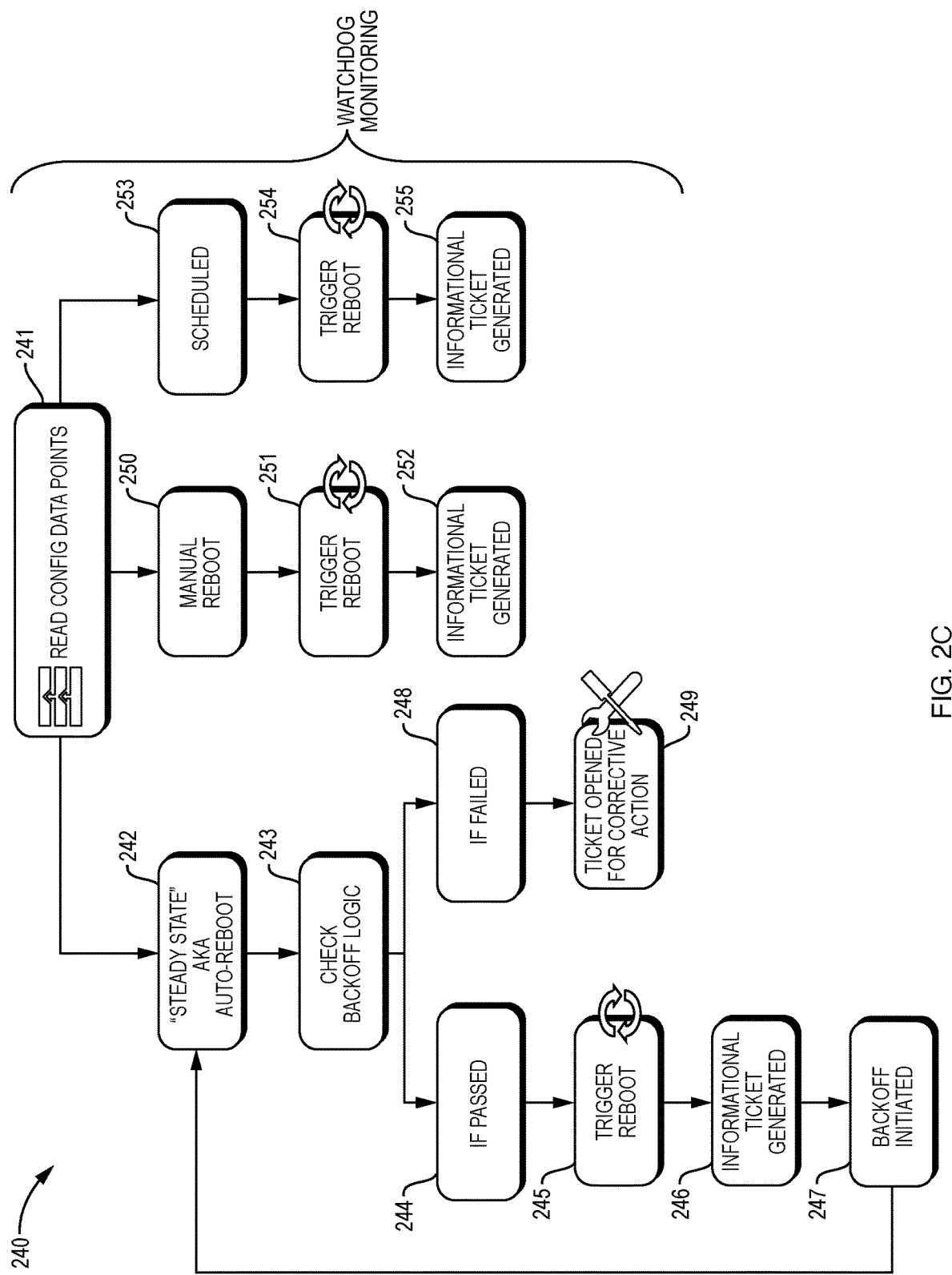
FIG. 2C is a flow diagram of a method for implementing reboot/backoff logic in relation to a method for rebooting an electronic device.

Continuing with FIG. 2A, in an embodiment, the step 221 steady state logic phase functionality performs the FIG. 2B method 230. Turning to FIG. 2B, the method 230 starts at step 231 by reading configuration data. The configuration data may be read from a database or any other suitable storage system known in the art. Example configuration data include the following:
  a) Details of "remote endpoints" (REs), i.e., network destinations used in conjunction with the data communications monitoring described herein, including failure coefficients for each RE.
  b) Sample failure conditions.
  c) Definitions of failure conditions, which may be user-specified.
  d) Backoff logic, which may be user-configured.

Next, at step 232, the method 230 conducts steady state data communications monitoring. The step 232 data communications monitoring may include testing at least one of access to an Internet server, such as via Internet 104 (FIG. 1), access to a DNS server, e.g., DNS server 101 (FIG. 1), accessing a URL, such as a website URL 102 (FIG. 1), making an API call, such as via API 103 (FIG. 1), receiving an API call, sending data via an Internet protocol, such as Transmission Control Protocol (TCP), User Datagram Protocol (UDP), Internet Control Message Protocol (ICMP), and any other protocols known in the art, and receiving data via an Internet protocol.

In an implementation, the data communications monitoring at step 232 may also include testing connectivity through an electronic device, e.g., modem 105 (FIG. 1), to a network point, e.g., a RE. In an aspect, a RE may include a destination on the public Internet or a private intranet. An RE may further be specified by a website URL, e.g., URL 102 (FIG. 1), such as:
  a) Google.com
  b) Cloudflare.com
  c) Akamai.com
  d) YouTube.com
  e) Facebook.com
  f) Twitter.com
  g) Amazon.com
  h) Yahoo.com
  i) Chase.com According to an embodiment, when a RE is specified by a URL, the URL may first be translated into a corresponding Internet Protocol (IP) address before attempting a connection. The translation may be performed via a DNS server, e.g., DNS 101 (FIG. 1), according to techniques known in the art.

In an implementation, a RE may also be a user-specific server on a user network, e.g., a private intranet. For example, the user-specific server may be a DNS server, a Dynamic Host Configuration Protocol (DHCP) server, a data inventory server, a resource server, or any other server known in the art.

According to an example embodiment, a RE may correspond to a DNS server, e.g., DNS 101 (FIG. 1), and may be further indicated directly with an IP address, such as:
  a) 8.8.8.8 (Google)
  b) 1.1.1.1 (Cloudflare)
  c) 208.67.222.222 (OpenDNS)
  d) 10.x.x.x (a user internal IP address, e.g., on a private intranet)

In another embodiment, a RE may also be an API, e.g., API 103 (FIG. 1). The API may further provide custom input from a user. According to some embodiments, an API is not a RE, but rather an electronic device connected to a PCC, e.g., PCC 108 (FIG. 1). In such embodiments, the PCC may communicate with an API endpoint on the electronic device and retrieve the results of an API call performed on the device. Depending on whether the retrieved results correspond to a predetermined value, the PCC may control the electronic device such as by rebooting the device, or performing some other action with respect to the device. Examples of other actions include executing a script that restarts the API on the electronic device.

Further, according to yet another aspect, the connection monitoring to a RE may be performed at step 232 via assorted protocols known in the art, including high-level transport protocols such as TCP and UDP, as well as low-level network layer protocols such as ICMP. TCP is more reliable (as compared to UDP) and includes a three-step process for verifying that data is transferred correctly. UDP may be used for applications such as Voice over Internet Protocol (VoIP) and other real-time applications. ICMP may be used to send a "ping" message to a RE.

In an implementation of step 232, when connecting to a RE via protocols such as TCP or UDP, a port number may be further specified for the RE, according to techniques known in the art. For example, when a RE corresponds to a DNS server, e.g., DNS 101 (FIG. 1), the port number may be specified as 443.

According to an example embodiment, when connecting to a RE via protocols such as TCP or UDP, additional types of data may be collected at step 232. Such data may include the amount of traffic sent to or received from a RE, which may be expressed as, e.g., kilobits or megabits per second (Kbps or Mbps). Other types of data may include the maximum, minimum, average, and/or total amount of traffic sent or received.

Similarly, when connecting to a RE, at step 232, via protocols such as ICMP, additional types of data may be collected. Such data may include the number of "ping" messages successfully transmitted to a RE, which may be expressed as a percentage value. Other types of data may include the elapsed time (i.e., latency) between sending a "ping" message and receiving an acknowledgement, which may be expressed as, e.g., milliseconds (ms).

To continue, the method 230 determines whether the data communications steady state monitoring 232 has detected a failure condition 234, or has not detected a failure condition 233. If a failure condition is not identified 233, the method 230 continues the steady state monitoring 232, and if a failure condition is identified 234, the method 230 moves to step 235 and triggers reboot/backoff logic. The reboot/backoff logic 235 may include the method 240 described hereinbelow in relation to FIG. 2C.

In embodiments, failure condition 234 may include disruption in connectivity as identified by an inability of the PCC 108 to connect to a network point, e.g., a RE. According to an implementation, and as described above with respect to configuration data, the data communications monitoring (step 232) and conditions of failure (step 234) is configurable.

In an aspect, failure conditions identified through steady state monitoring 232 and evaluated at step 234 and 233, including user specified conditions as described above, may be defined in various ways. For example, a failure condition and its corresponding reboot action(s) may be defined according to one or more of the exemplary categories below:
  a) Modem Metrics
    i. Downstream power outside +8 db to −8 db: reboot
    ii. Upstream power outside 40-50 db: reboot
    iii. Signal/Noise Ratio (SNR) <25 db or >40 db: reboot
    iv. Uptime>60 days: reboot
  b) CPU Usage
    i. CPU usage>70%: reboot at designated "off hours" time; alert Network Operations Center (NOC) via ticket
    ii. Average CPU usage from previous 7 days>20%: reboot at designated "off hours" time
  c) Memory Usage
    i. Memory usage>80%: reboot at designated "off hours" time
    ii. Average memory usage from previous 7 days>20%: reboot at designated "off hours" time
  d) Network Points (e.g., Remote Endpoints)
    i. URL via UDP [Tier 1]
      1) URLs—Google.com, Cloudflare.com, Akamai.com, name server on customer network
      2) Failure to connect to all four REs after 10 attempts over 5 minutes (i.e., retry connection every 30 seconds): reboot
    ii. DNS Servers via TCP [Tier 2]
      1) Servers—8.8.8.8:443 (Google), 1.1.1.1:443 (Cloudflare), 208.67.222.222:443 (OpenDNS), 10.x.x.x (customer internal IP address)
      2) Failure to connect to all four REs after 10 attempts over 5 minutes (i.e., retry connection every 30 seconds): reboot
    iii. DNS Servers via UDP [Tier 3]
      1) Servers—8.8.8.8 (Google), 1.1.1.1 (Cloudflare), 208.67.222.222 (OpenDNS), 10.x.x.x (customer internal IP address)
      2) Failure to connect to all four REs after 10 attempts over 5 minutes (i.e., retry connection every 30 seconds): reboot
    iv. ICMP/API [Tier 4]
      1) Servers—8.8.8.8 (Google), 1.1.1.1 (Cloudflare), 208.67.222.222 (OpenDNS)
      2) Failure to connect following a second attempt after 30 seconds: reboot As described hereinabove, and according to an embodiment, failure conditions associated with network points may be grouped or categorized according to various priority "buckets" or tiers. For example, each of the above network point failure conditions i-iv is assigned to a numbered tier, with, e.g., Tier 1 corresponding to a critical priority and Tier 4 corresponding to a lowest priority.

It should be noted that any failure conditions described herein are exemplary only. Moreover, as stated hereinabove, in some embodiments, failure conditions may be included as part of a default configuration for, e.g., the PCC 108; failure conditions may also be user-configured. According to an aspect, users may configure the following values associated with failure conditions:
  a) Information about a RE.
  b) Number of REs.
  c) RE priority bucket/tier.
  d) Frequency of RE checks/connection attempts.
  e) Information about action(s) to take.
  f) Number of action(s) to take.

Continuing with the method 230 of FIG. 2B, if no failure condition is detected at step 233, the method 230 returns to step 232. At step 234, if a failure condition is detected, the method 230 continues to a reboot/backoff logic phase at step 235.

Figure 8:
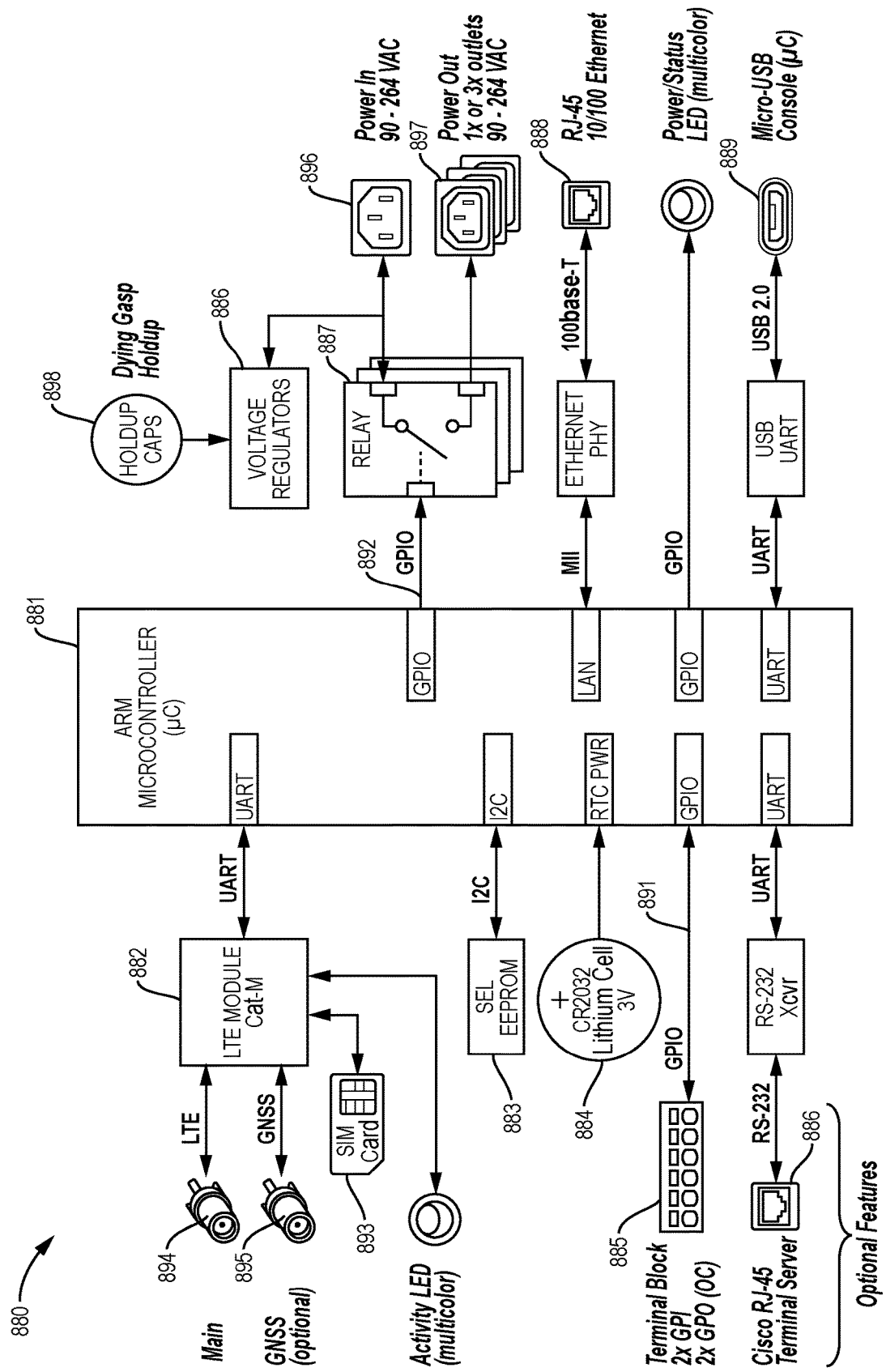
FIG. 8 is a block diagram illustrating a power cycle controller, according to an example embodiment.

Referring again to FIG. 2A, if a failure condition is detected at step 222, the method 220 compares the failure condition to a baseline configuration at step 223. According to an aspect, the comparison may include a logical comparison. For example, where a configured range for a given parameter is 8-17, comparing a value of 14 will result in a determination that the value falls within the range, while comparing a value of 19 will result in a determination that the value falls outside the range. According to some embodiments, different comparison results will trigger different types of logic. If the comparison 223 indicates that a failure condition exists at step 224, the method 220 then moves to step 225 and reboots the device. The method 220 reboots the electronic device, e.g., modem 105 (FIG. 1), at step 225 by sending a general-purpose input/output (GPIO) signal to an electrical relay. In an embodiment, the GPIO signal may be sent via, e.g., GPIO port 892 (FIG. 8), to an electrical relay, e.g., relay 887 (FIG. 8). After the reboot 225, the method 220 performs a backoff at step 226 and after the backoff 226, the method 220 returns to the steady state monitoring 221. The method 220 may implement the reboot/backoff method 240, described hereinbelow in relation to FIG. 2C, at steps 225/226 according to an embodiment. Alternately, if the comparison 223 indicates that a failure condition is not present at step 227, the method 220 returns to the steady state monitoring 221.

FIG. 2C is a flow diagram of a method 240 for implementing reboot/backoff logic that may be implemented at steps 225 and 226 of the method 220 (FIG. 2A) and/or step 235 of the method 230 (FIG. 2B). According to an embodiment, and as described above with respect to steps 231 and 232 of the method 230 (FIG. 2B), the method 240 of FIG. 2C reads configuration data at step 241 and enters a steady state/auto-reboot phase at step 242.

The steady state/auto-reboot phase 242 then moves to step 243 where the backoff logic is checked. In an aspect, the backoff logic—including a backoff period, expressed in, e.g., seconds (s)—may be specified according to one or more of the below examples:
  a) If number of reboots of the electronic device, e.g., modem 105 (FIG. 1), in last three hours=0: reboot, backoff 180 s (i.e., 3 min.).
  b) If number of reboots of the electronic device in last 180 s (i.e., 3 min.)=1: no action.
     i. Else: reboot, backoff 300 s (i.e., 5 min.).
  c) If number of reboots of the electronic device in last 300 s (i.e., 5 min.)=2: no action.
     i. Else: reboot, backoff 600 s (i.e., 10 min.).
  d) If number of reboots of the electronic device in last 600 s (i.e., 10 min.)=3: no action.
     i. Else: reboot, backoff 18,000 s (i.e., five hours), open ticket for corrective action.

As described above with respect to step 231 of method 230 (FIG. 2B), the backoff logic may be included in the configuration data and may be partly or wholly user-configured.

Continuing with the flow of the method 240 of FIG. 2C, if the backoff logic check fails at step 248, a ticket is opened for corrective action at step 249. According to an aspect, the ticket for corrective action may be opened with, e.g., an internet service provider (ISP). The ticket may also be for external corrective action. If the backoff logic check passes at step 244, a reboot is triggered at step 245. Following the reboot 245, an informational ticket is generated at step 246. The method 240 then initiates backoff at step 247. Finally, the method 240 returns to the steady state 242.

According to another embodiment, the processor of, e.g., PCC 108 (FIG. 1), is configured to reboot the electronic device, e.g., modem 105 (FIG. 1), by opening the switch, e.g., relay 887 (FIG. 8), that connects the first power port to the second power port and closing the switch following a backoff period. In an implementation, the backoff period may be specified as described above with respect to step 243 of method 240 (FIG. 2C).

Referring again to FIG. 2C, in another aspect, the method 240 may determine whether a manual reboot is requested at step 250. If a manual reboot is requested, at step 251, the method 240 triggers a reboot of the electronic device, e.g., modem 105 (FIG. 1). An informational ticket is then generated at step 252. According to yet another aspect, the method 240 may determine whether a scheduled reboot is required at step 253. If a scheduled reboot is required, at step 254, the method 240 triggers a reboot of the electronic device, e.g., modem 105 (FIG. 1). An informational ticket is then generated at step 255.

In an embodiment, watchdog monitoring is performed with respect to every step of the method 240. According to an aspect, the watchdog monitoring may be performed by a "watchDogService" function such as described hereinbelow with respect to FIG. 10.

Figure 3:
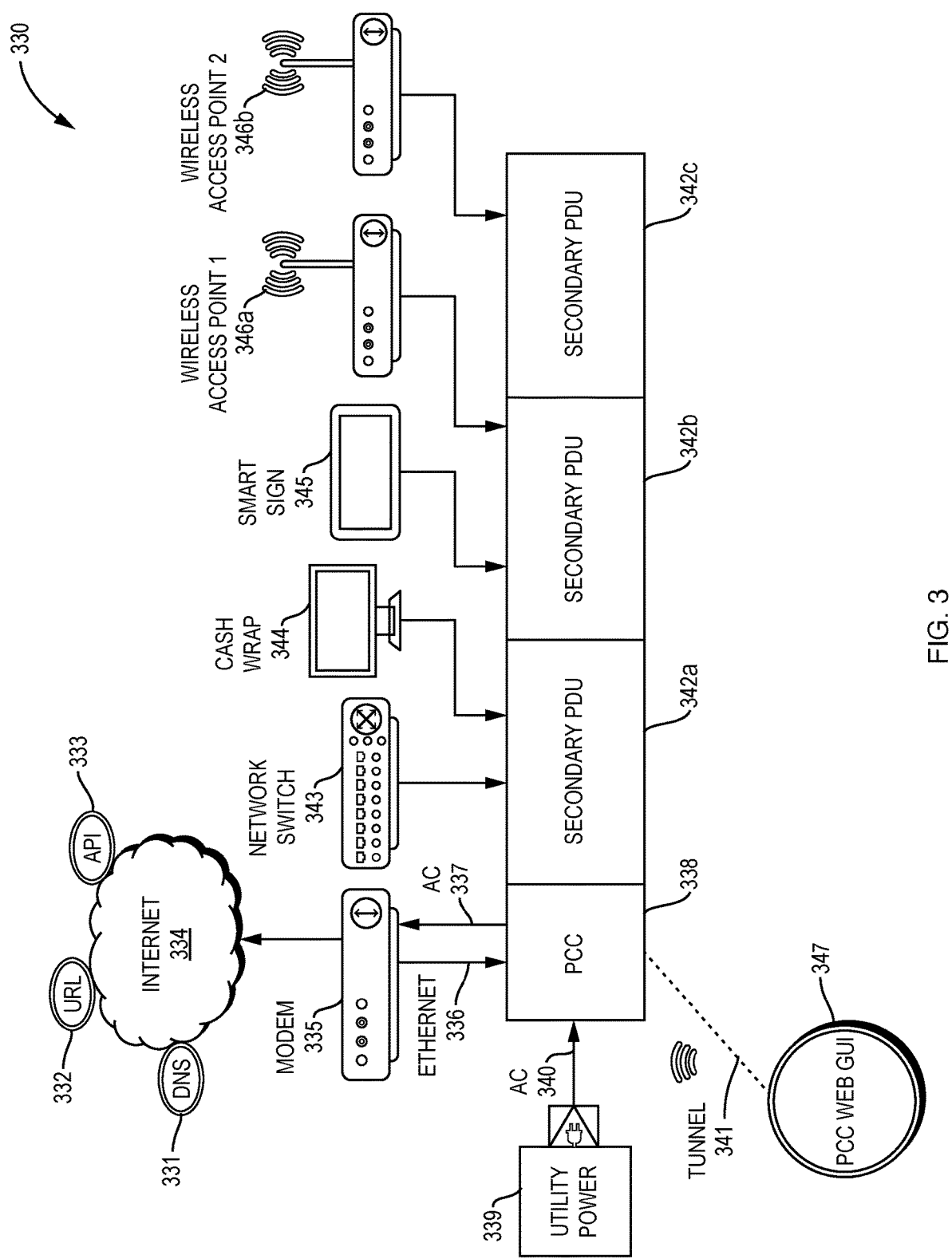
FIG. 3 is a simplified block diagram of an exemplary system for controlling multiple electronic devices.

FIG. 3 is a simplified block diagram of an exemplary system 330 for controlling multiple electronic devices. Like the system 100 (FIG. 1), the system 330 includes a PCC 338 that is configured to cycle power to a modem 335. The PCC 338 receives power from a utility power source 339 via an AC connection 340 and delivers power to the modem 335 via an AC connection 337. Further, the PCC 338 (i) conducts data communications monitoring of the modem 335 via a communication connection 336 and (ii) reboots the modem 335 responsive to the data communications monitoring. The data communications monitoring, according to an embodiment, includes the PCC 338 using the communication connection 336 and the modem 335 to connect to an Internet 334 and points accessible via the Internet 334, e.g., a DNS server 331, a website URL 332, and an API 333.

Again similar to the system 100, in an aspect, the system 330 additionally includes an exemplary cloud management system PCC Web GUI 347 and a cellular connection tunnel 341. The PCC 338 may also connect to the PCC Web GUI 347 via the cellular connection 341.

In an implementation, the system 330 further includes one or more secondary power distribution units (PDUs) 342a-c. According to one such implementation, each of the secondary PDUs 342a-c connects to one or more electronic devices, such as network switch 343, cash wrap 344, smart sign 345, and wireless access points 346a-b.

According to an aspect, the modem 335 can be a first electronic device and the PCC 338 may further include a communication interface (not shown) configured to connect to a control-device, e.g., the secondary PDU 342a, communicatively coupled to a second electronic device, e.g., the network switch 343 or cash wrap 344. In an embodiment, the processor (not shown) of PCC 338 may be further configured to send a command to the control-device, e.g., the secondary PDU 342a, and receive data from the control-device 342a. According to yet another embodiment, the control-device, e.g., the secondary PDU 342a, is configured to perform one or more control operations of the second electronic device, e.g., the network switch 343 or cash wrap 344. For instance, the secondary PDUs 342a-c may be configured to perform the functionalities of the PCC 338. In an example embodiment, the secondary PDUs 342a-c can implement the methods 220, 230, 240, 400, and/or 600, described herein in relation to FIGS. 2A, 2B, 2C, 4, and 6, respectively, to perform control operations, e.g., reboots, of the electronic devices 343, 344, 345, and 346a-b.

According to an embodiment, the secondary PDUs 342a-c are also communicatively coupled with the PCC Web GUI 347 via the cellular connection 341 of the PCC 338. In such an implementation, the PDUs 342a-c communicate with the PCC 338 to facilitate data communication to and from the PCC Web GUI 347 utilizing the PCC 338's cellular connection 341. In this way, according to an embodiment, the secondary PDUs 342a-c may be functionally equivalent to the PCC 338, with the exception being that the secondary PDUs 342a-c do not have a cellular interface and, instead, rely on the PCC 338's cellular interface to communicate with the PCC Web GUI 347.

Figure 4:
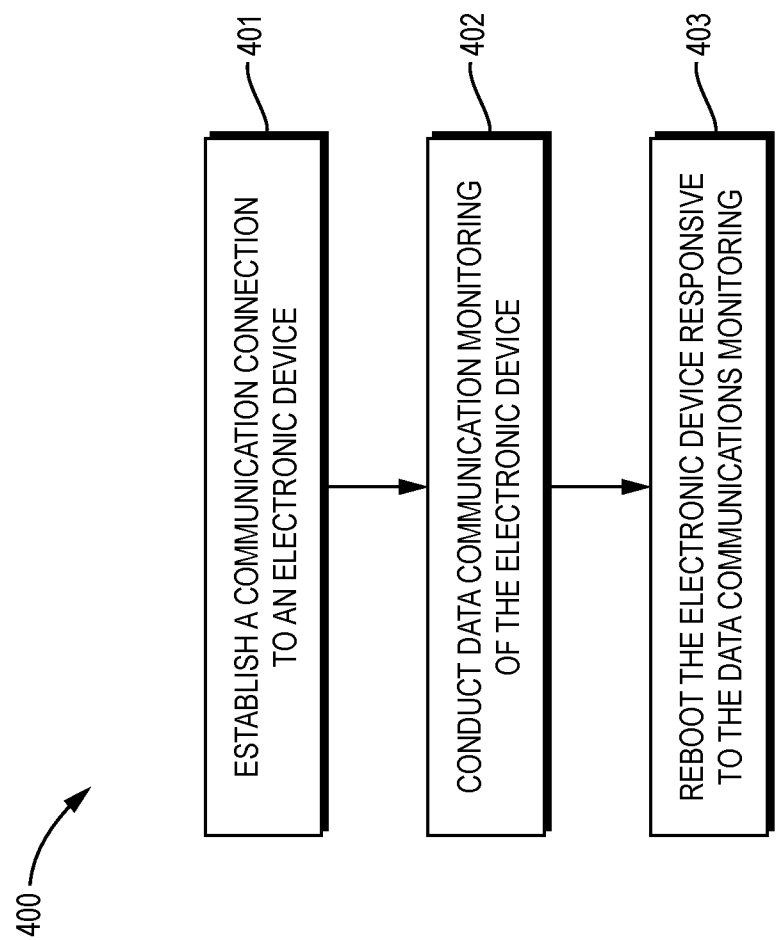
FIG. 4 is a flow diagram of a method for rebooting an electronic device, according to an embodiment.

FIG. 4 is a flow diagram of a method 400 for rebooting an electronic device, according to an embodiment. The method 400 may be implemented by a power cycle controller as described herein, e.g., PCC 108 (FIG. 1), PCC 338 (FIG. 3), and/or PDUs 342a-c (FIG. 3).

The method 400 starts at step 401 by establishing a communication connection with an electronic device. With reference to FIG. 1, according to an aspect, the PCC 108 may establish communication connection 106 with the modem 105. The communication connection 106 may be any communication connection known in the art, such as an Ethernet or WiFi connection. Similarly, referring to FIG. 3, in an implementation, the PCC 338 may establish Ethernet connection 336 to the modem 335, and/or one or more of the secondary PDUs 342a-c may establish a communication connection to one or more of the network switch 343, cash wrap 344, smart sign 345, and/or wireless access points 346a-b, respectively.

Next, at step 402, the method 400 conducts data communications monitoring of the electronic device. In some embodiments, for example, the PCC 108, PCC 338, and/or PDUs 342a-c may conduct data communications monitoring of one or more electronic devices such as modem 105, modem 335, network switch 343, cash wrap 344, smart sign 345, and/or wireless access points 346a-b. The data communications monitoring may be conducted in the manner described above with respect to step 232 of the method 230 (FIG. 2B).

Last, at step 403, the method 400 reboots the electronic device responsive to the data communications monitoring. In some implementations, for instance, the PCC 108, PCC 338, and/or PDUs 342a-c may reboot one or more electronic devices such as modem 105, modem 335, network switch 343, cash wrap 344, smart sign 345, and/or wireless access points 346a-b. Rebooting the one or more electronic devices may be performed according to reboot/backoff logic as described above with respect to the method 240 (FIG. 2C).

Figure 5:
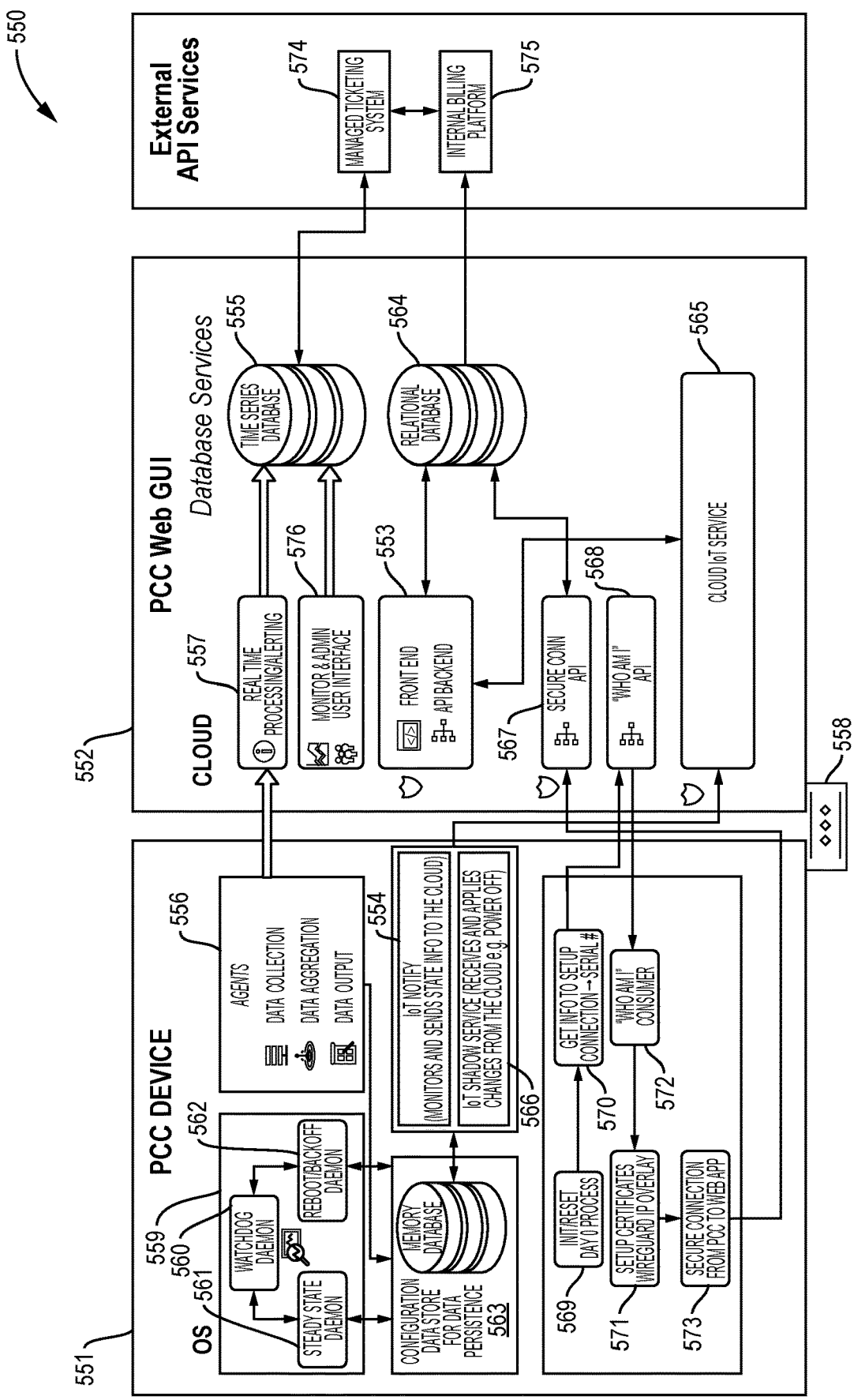
FIG. 5 is a simplified block diagram of a system for controlling an electronic device, according to an embodiment.

FIG. 5 is a simplified block diagram of a system 550 for controlling an electronic device, according to an embodiment. Specifically, the system 550 includes a PCC 551 and a cloud management system 552. In an implementation, the PCC 551 includes (not shown) a cellular interface, a data interface, and a processor. The cellular interface is configured to connect via a LTE or other wireless connection 558 to the cloud management system 552, which may be, e.g., PCC Web GUI 112 (FIG. 1). The data interface is configured to connect to the electronic device (not shown), which may be, e.g., modem 105 (FIG. 1). The processor is configured to perform one or more control operations of the electronic device. Further, according to another embodiment, the one or more control operations may include at least one of executing a script, a reboot, reporting to the cloud management system 552, taking any preprogrammed action, and sending an impulse to the electronic device. According to an aspect, the impulse may be logical or electrical, and may further be based on a departure from one or more predetermined conditions, such as the failure conditions described hereinabove.

In an embodiment, the PCC 551 may include a memory database 563. According to some aspects, the memory database 563 may include one or more database systems such as SQLite, Prometheus, Redis, or InfluxDB, and/or any other suitable database or storage system known to those in the art.

In some implementations, the PCC 551 may include an operating system (OS) 559. According to such implementations, the OS 559 may be a Linux-based OS, e.g., a version of a Debian Linux distribution, or any other OS known to those of skill in the art. In an aspect, the OS 559 may include watchdog daemon 560, steady state daemon 561, and reboot/backoff daemon 562. According to such an aspect, the watchdog daemon 560 may include a service that observes the steady state daemon 561 and controls it by, for example, restarting the steady state daemon 561 if an unrecoverable issue occurs. The reboot/backoff daemon 562 may be invoked by the steady state daemon 561 when reboot and/or backoff services are required. According to some embodiments, the watchdog daemon 560 may be implemented via, e.g., a "watchDogService" function 1010, described in more detail hereinbelow with respect to FIG. 10. The steady state daemon 561 and reboot/backoff daemon 562 may be implemented variously by the methods 220, 230, and/or 240, described in more detail hereinabove with respect to FIGS. 2A, 2B, and 2C, respectively. In some aspects, one or more of the watchdog daemon 560, steady state daemon 561, and reboot/backoff daemon 562 may communicate with the memory database 563. For example, the watchdog daemon 560, steady state daemon 561, and/or reboot/backoff daemon 562 may retrieve data from or store data to the memory database 563.

According to an example embodiment, the PCC 551 may include agents 556. The agents 556 may include binaries, processes, and/or services running or executing on the PCC 551. For example, the agents 556 may perform tasks such as data collection, data aggregation, and data output concerning various aspects of the system 550, including the PCC 551, one or more electronic devices, e.g., the modem 105 (FIG. 1), connected to the PCC 551, and/or one or more communications networks. In some aspects, the agents 556 may communicate with the memory database 563. For example, the agents 556 may retrieve data from or store data to the memory database 563.

In another example embodiment, the cloud management system 552 may include a time series database 555 and a relational database 564. According to an aspect, and as described in more detail hereinbelow with respect to FIG. 7, the time series database 555 may be used to store information concerning data communications monitoring performed by the PCC 551. In an implementation, the relational database 564 may be a PostgreSQL database, or any other suitable database or storage system known in the art. The relational database 564 may be used, for example, to store "static" information, such information regarding customers, locations, etc.

Further, in yet another example embodiment, the cloud management system 552 may include a front end/API backend 553 and a cloud Internet-of-Things (IoT) service 565, and the PCC 551 may include an IoT notify component 554. According to such an embodiment, the front end 553 may be implemented using React or any other suitable system known to those of skill in the art. In an implementation, the IoT notify component 554 may run or execute on the PCC 551 and may adjust or modify various parameters associated with one or more of the watchdog daemon 560, steady state daemon 561, and reboot/backoff daemon 562. According to such an implementation, parameters may be "posted" to the IoT notify component 554 by the cloud management system 552. The IoT notify component 554 may also retrieve information concerning the operating status of the agents 556 indirectly by querying such information from the memory database 563. In an aspect, the processor of PCC 551 is further configured to receive an indication of the one or more control operations via the cloud management system 552 and in response to the received indication, perform the one or more control operations. For example, the indication may be received from front end 553 by the cloud IoT service 565, and then relayed by the cloud IoT service 565 to the IoT notify component 554. According to an embodiment, the indication of the one or more control operations is provided by a user via the cloud management system 552. Further, in yet another embodiment, the processor is further configured to monitor the electronic device, e.g., modem 105 (FIG. 1), via the data interface and perform the one or more control operations responsive to the monitoring.

In an embodiment, the cloud management system 552 may include a real-time processing/alerting component 557, which may be implemented using the Apache Kafka system or any other suitable system known in the art. According to an implementation, the PCC 551 collects data, such as via the agents 556, and sends the data for storage in the time series database 555, for example via the real-time processing component 557. In an embodiment, the data is collected periodically (e.g., every 10 s), analyzed, and used to generate aggregate information. According to such an embodiment, the real-time processing component 557 may also take various action(s) in response to data received from the PCC 551. Examples of such actions include opening tickets and generating alerts. Further, in an aspect, the data may also or alternatively be sent to an Amazon Web Services (AWS) or other known database or storage system. This may be accomplished using suitable techniques known in the art, including ELK (Elastic Search, Logstash, Kibana), Grafana, and CRUD (Create, Read, Update, Delete).

According to an aspect, the PCC 551 may include an IoT shadow service 566. In such an aspect, the cloud IoT service 565 of PCC Web GUI 552 may also include compute and/or storage functionality provided at one or more locations. For example, the cloud IoT service 565 may be used to store various configuration and/or state data, etc. According to an embodiment, the cloud IoT service 565 may include functionality such as a software repository and/or package hosting, as well as versioning for software and/or source code. In such an embodiment, the IoT shadow service 566 and the cloud IoT service 565 communicate in various ways to allow for updating and/or modifying of various packages, binaries, scripts, and/or software versions on the PCC 551. For example, the cloud IoT service 565 may connect to the IoT shadow service 566 via the Secure Shell Protocol (SSH) or other known techniques and may transfer differential data. Alternately, the IoT shadow service 566 may poll the cloud IoT service 565 using an API, or any other suitable technique known in the art.

According to an implementation, the cloud management system 552 may include a secure connection API 567 and a "Who am I?" (identity) API 568. In such an implementation, the PCC 551 may correspondingly include an init/reset process 569, a setup process 570, a certificate process 571, a consumer process 572, and a secure connection process 573. According to an aspect, the aforementioned components/processes may interact in the following sequence. First, the init process 569 invokes the setup process 570, which includes the serial number of the PCC 551. The serial number may be associated with a customer location in the relational database 564. Next, the setup process 570 communicates with the identity API 568. The identity API 568 then transmits an initial "Day 0" configuration for the PCC 551, which is received by the consumer process 572. In an implementation, the initial configuration may include a network address, such as an IP address, as well as a client certificate. According to such an implementation, the client certificate may be used by the certificate process 571 to facilitate creating a secure connection, such as cellular communication connection 558. The secure connection process 573 may then communicate with the secure connection API 567. In this way, configuration of the PCC 551 may be performed automatically in a "zero touch" fashion without requiring effort or input by a user.

In an embodiment, the system 550 also includes a ticketing system 574 and a billing platform 575. According to such an embodiment, the ticketing system 575 may communicate with the time series database 555 and may provide features including opening a ticket with a NOC. Similarly, the billing platform 576 may communicate with the relational database 564 and may provide features including checking activation for an apparatus, e.g., the PCC 551, as well as customer billing.

According to an aspect, the cloud management system 552 may include a monitor/admin user interface (UI) 576. In such an aspect, the monitor UI 576 may include one or more built-in frontends provided by, e.g., Apache and other known systems, and may be used to access data stored in the time series database 555.

Figure 6:
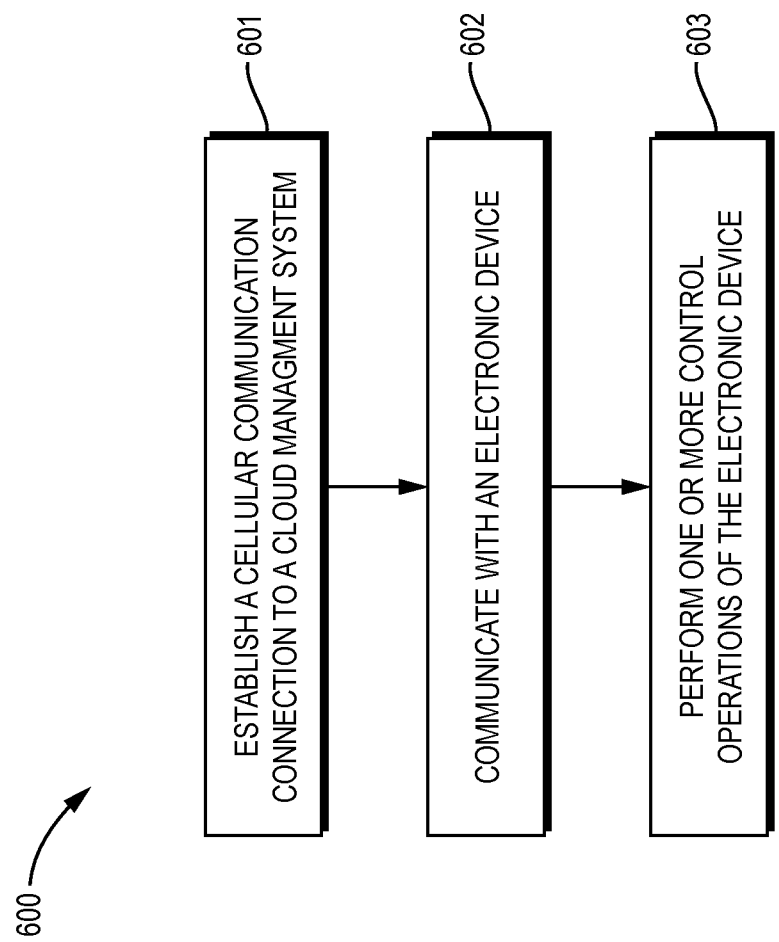
FIG. 6 is a flow diagram of an example method for controlling an electronic device.

FIG. 6 is a flow diagram of a method 600 for controlling an electronic device, according to an embodiment. The method 600 may be implemented by a power cycle controller as described herein, e.g., PCC 108 (FIG. 1), PCC 338 (FIG. 3), and/or PCC 551 (FIG. 5).

The method 600 starts at step 601 by establishing a cellular communication connection to a cloud management system. With reference to FIG. 5, according to an aspect, the PCC 551 may establish cellular communication connection 558 to the cloud management system PCC Web GUI 552. Similarly, referring to FIGS. 3 and 1, in some implementations, the PCC 338 or 108 may establish cellular communication connection 341 or 111 to PCC Web GUI 347 or 112, respectively. The cellular communication connection 558, 341, or 111 may be any cellular connection known in the art, such as a LTE connection.

Next, at step 602, the method 600 communicates with an electronic device. According to an embodiment, for example, the PCC 551 may communicate with an electronic device such as a modem. The electronic device may also be a router, network switch, cash wrap, smart sign, wireless access point, or any other electronic device known in the art. In other embodiments, the PCC 338 or 108 may communicate with e.g., modem 335 or 105, respectively. The communication may be performed via an Ethernet or WiFi connection, such as connection 336 (FIG. 3) or 106 (FIG. 1), or any other connection known in the art.

In turn, at step 603, the method 600 performs one or more control operations of the electronic device. According to an aspect, the PCC 551 may perform the one or more control operations of the electronic device. In other aspects, the PCC 338 or 108 may perform the one or more control operations of e.g., modem 335 or 105. The one or more control operations may include at least one of executing a script, a reboot, reporting to the cloud management system 552, taking any preprogrammed action, and sending an impulse to the electronic device. According to an aspect, the impulse may be logical or electrical, and may further be based on a departure from one or more predetermined conditions, such as the failure conditions described hereinabove.

Figure 7A:
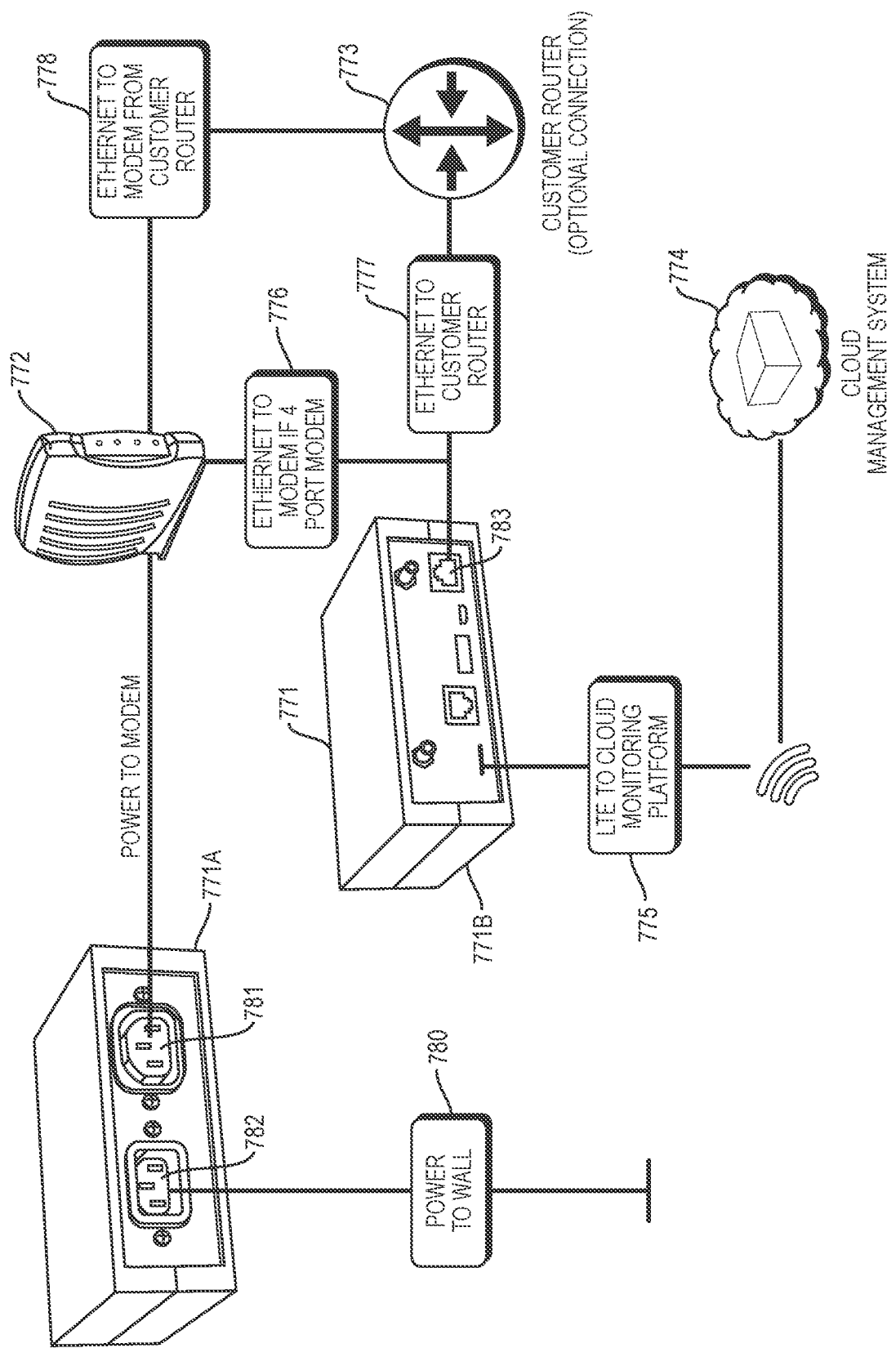
FIG. 7A is a system block diagram illustrating a remote cloud-based management system in communication with a power cycle controller having a single alternating current (AC) output port and co-located with a customer device, according to an example embodiment.

Referring to FIG. 7A, an example embodiment is shown in which a cloud management system 774 communicates with a PCC 771 having one AC output port 781 for controlling power to a customer device, such as modem 772.

The PCC 771 is shown with front view 771A and rear view 771B. Looking at the front view 771A, the PCC 771 has one AC power inlet 782 that connects to a source of AC power 780 and an outlet 781 that delivers AC power out to power the modem 772. In other embodiments, there can be additional AC outputs to power additional devices.

Looking at the rear view 771B, the PCC 771 has an Ethernet port 783 that has a cable connection 776 to the modem 772 or a cable connection 777 to a customer router 773. The customer router 773 has a cable connection 778 to the modem 772. Ethernet port 783 has an option either to connect directly 776 to modem 772 or to connect to modem 772 indirectly 777 via customer device 773; both options 776 and 777 are shown in FIG. 7A. The cloud management system 774 is in communication with the PCC 771 via a LTE or other such wireless connection 775. The cloud management system 774 communicates with the PCC 771, handles transferring data in time slices, and provides a capability to remotely manage a plurality of PCCs and customer devices. Time slices of data from the local device, i.e., the device 772 being monitored, are transferred to the cloud management system 774 over the LTE connection 775 for visibility so that the customer can receive feedback including: (1) the customer device 772 was rebooted and resolved the communications issue; (2) the customer device is functioning nominally; and/or (3) the customer device was rebooted, the issue was not resolved and other action is required to correct the issue.

In embodiments, the serviced, i.e., monitored, controlled, etc., devices (e.g., modem 772) can be any devices known in the art. Moreover, serviced devices are not limited to devices that rely on IP communication. In such an example embodiment, the PCC 771 can cycle power based on a user command or in accordance with a schedule. Moreover, it is noted that, devices that rely on IP communication can likewise be rebooted or otherwise controlled based on a user command or in accordance with a schedule.

Figure 7B:
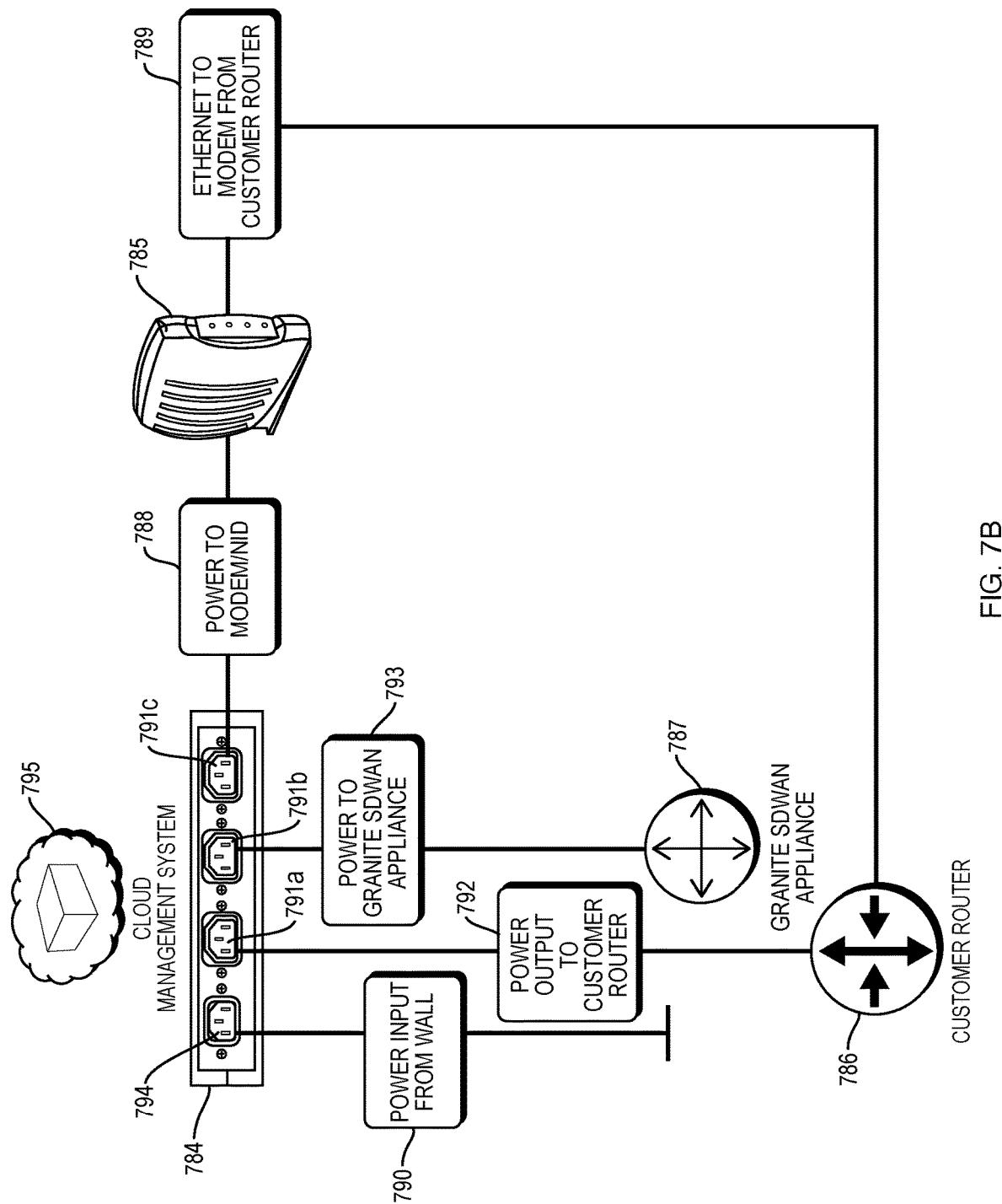
FIG. 7B is a system block diagram illustrating a remote cloud-based management system in communication with a power cycle controller having three AC output ports and co-located with multiple customer devices, according to another example embodiment.

FIG. 7B illustrates another example embodiment in which a PCC 784 has three AC output ports 791a-c for controlling power to three customer devices: modem 785, customer router 786, and software-defined wide area network (SD-WAN) appliance 787. The PCC 784 receives power 790 via input power port 794. In turn, the PCC 784 provides, via the respective output power ports 791a-c, modem/network interface device (NID) power 788 to modem 785, customer router power 792 to router 786, and SDWAN appliance power 793 to SDWAN appliance 787. The customer router 786 further has a cable connection 789 to the modem 785. Via a LTE or other such cellular or wireless connection (not shown), the PCC 784 communicates with a cloud management system 795.

According to an embodiment, the modem 785 is a first electronic device, an Ethernet port (not shown) of the PCC 784 is a first data interface, the input power port 794 is a first power port, the output power port 791c is a second power port, and a switch (not shown) of the PCC 784 is a first switch. In one such embodiment, the PCC 784 further includes a second data interface (not shown), a third power port 791a, and a second switch (not shown). The second data interface is configured to connect to a second electronic device, e.g., the customer router 786, and the third power port 791a is configured to deliver power 792 to the second electronic device 786. The second switch is configured to connect the first power port 794 to the third power port 791a. According to one such embodiment, a processor (not shown) of the PCC 784 is configured to (i) conduct data communications monitoring of the second electronic device 786 via the second data interface and (ii) reboot the second electronic device 786 responsive to the data communications monitoring of the second electronic device 786. In an example embodiment, the reboot of the second electronic device 786 is independent of the reboot of the first electronic device, e.g., modem 785.

FIG. 8 is a block diagram showing an example embodiment of a PCC 880. The PCC 880 includes a processor 881, such as an ARM microcontroller. The processor 881 performs data communication monitoring and power control functions as described herein.

In the PCC 880, wireless connectivity is provided through a LTE module 882 which connects to a SIM card 893. The LTE module 882 features an embedded LTE Cat-M global radio to provide a connection to a Remote Administrator via a remote cloud management system, e.g., 774 (FIG. 7A). Two external SubMiniature version A (SMA) connectors are provided for LTE data 894 and optional global navigation satellite system (GNSS) position/location 895.

The power control function is provided by a relay 887 controlled through a GPIO port 892 of the microcontroller 881. The relay 887 is operated between closed and open positions to connect or disconnect, respectively, AC power received via input 896 to a customer device via output port 897.

Voltage regulators 886 connected to holdup capacitors 898 provide a "dying gasp" holdup circuit for use when power to the PCC 880 is interrupted. The holdup time of the holdup circuit is designed to keep mainboard components powered long enough for multiple dying gasp notification packets to be sent out on the Ethernet and LTE networks to a Remote Administrator, e.g., located at the PCC Web GUI.

Ethernet port 888 provides for wireline connectivity to a customer device for the PCC 880 to monitor the data connectivity of the device.

Universal Serial Bus (USB) port 889 provides for console access to the microcontroller 881.

RS-232 port 886 provides a terminal server connection to support Serial over LAN (SoL) connection to a Remote Administrator via Ethernet and/or LTE.

External GPIO port 891 can be connected to an external terminal block 885 to provide for external control of other customer devices.

An onboard electrically erasable programmable read-only memory (EEPROM) 883 is used to record a rolling system event log (SEL) of software-configurable, timestamped system events including AC power loss.

An internal battery 884 provides power for a real-time clock (RTC) function embedded in the microcontroller 881.

Remote management of the PCC 880 may include the following functions:

Unit power/health monitoring;
Remote AC output control;
Remote GPIO control and monitoring;
Dying Gasp notification transmissions over wide area network (WAN);
Terminal Server SoL to remote device console port.

Figure 9:
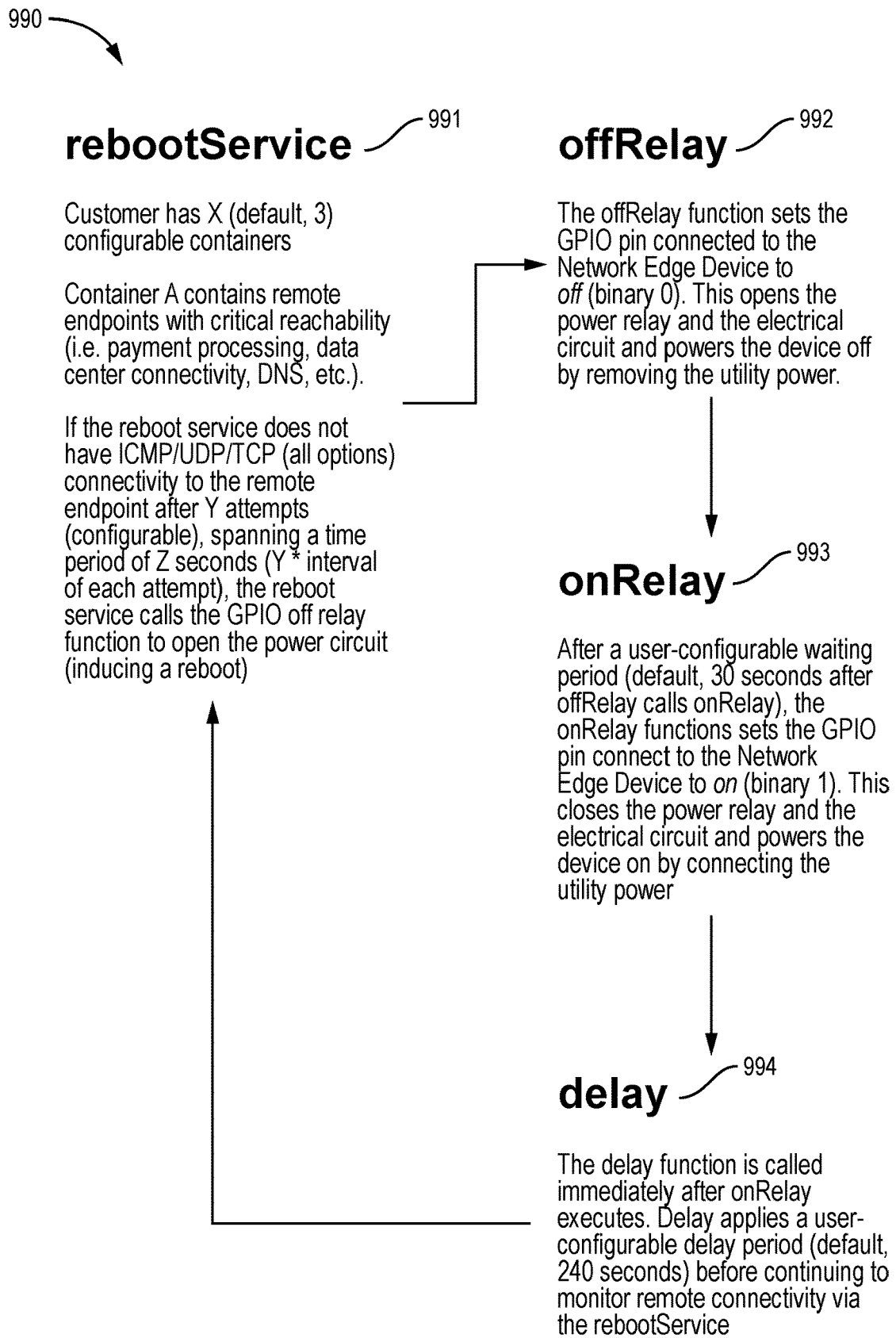
FIG. 9 is a flow diagram illustrating processes operating at a power cycle controller in relation to power control of a customer device, according to an example embodiment.

FIG. 9 is a flow diagram illustrating a process 990, and sub-processes thereof 991-994 operating at a PCC (e.g., the PCC 771 of FIG. 7A) to provide power control of a device, according to an example embodiment.

The "rebootService" process 991 monitors data connectivity of a device, e.g., modem 772. For example, the process 991 may monitor ICMP/UDP/TCP connectivity. If such connectivity is lacking after Y attempts (configurable), spanning a time period of Z seconds (Y*interval of each attempt), the reboot service 991 calls the GPIO off relay function 992 ("offRelay") to open the power circuit (e.g., relay 887 controlled through GPIO port 892 of microcontroller 881 in FIG. 8), thereby inducing a reboot.

The offRelay function 992 sets the GPIO pin connected to a relay to off (binary 0) which opens the relay to remove utility power to the device.

After a user-configurable waiting period (e.g., 30 seconds), offRelay 992 calls onRelay 993. The onRelay function 993 sets the GPIO pin connected to the relay to on (binary 1) which closes the relay to deliver the utility power to the device.

The delay function 994 is called immediately after onRelay 993 executes. This delay function 994 provides a user-configurable delay period (e.g., 240 seconds) before continuing to monitor remote connectivity via the rebootService 991.

Figure 10:
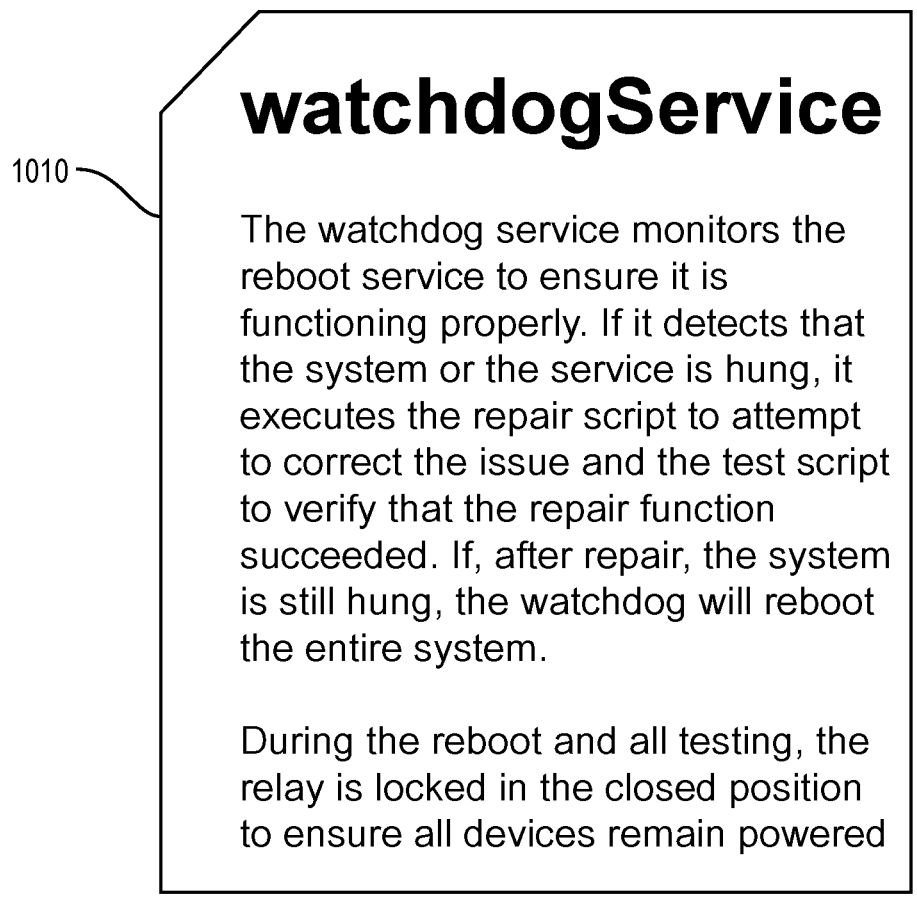
FIG. 10 illustrates a watchdog service according to an example embodiment.

FIG. 10 illustrates a "watchDogService" function 1010 that monitors the reboot service, e.g., process 990 and/or sub-processes 991-994 thereof, to ensure that the reboot service is functioning properly. If the watchDogService function 1010 detects that the system or the reboot service is unresponsive (i.e., "hung"), the watchDogService function 1010 executes a repair script to attempt to correct the issue and a test script to verify that the repair function succeeded. If, after repair, the system or reboot service is still unresponsive, the watchdog 1010 will reboot the entire system or service. According to an embodiment, during the reboot and all testing, the relay is locked in the closed position to ensure devices remain powered. The relay is closed by default. The relay is opened by issuing a signal from the attached GPIO pin. During failure the GPIO will not communicate to the relay to issue a binary open command and this ensures that the device fails closed/all devices remain powered.

Figure 11:
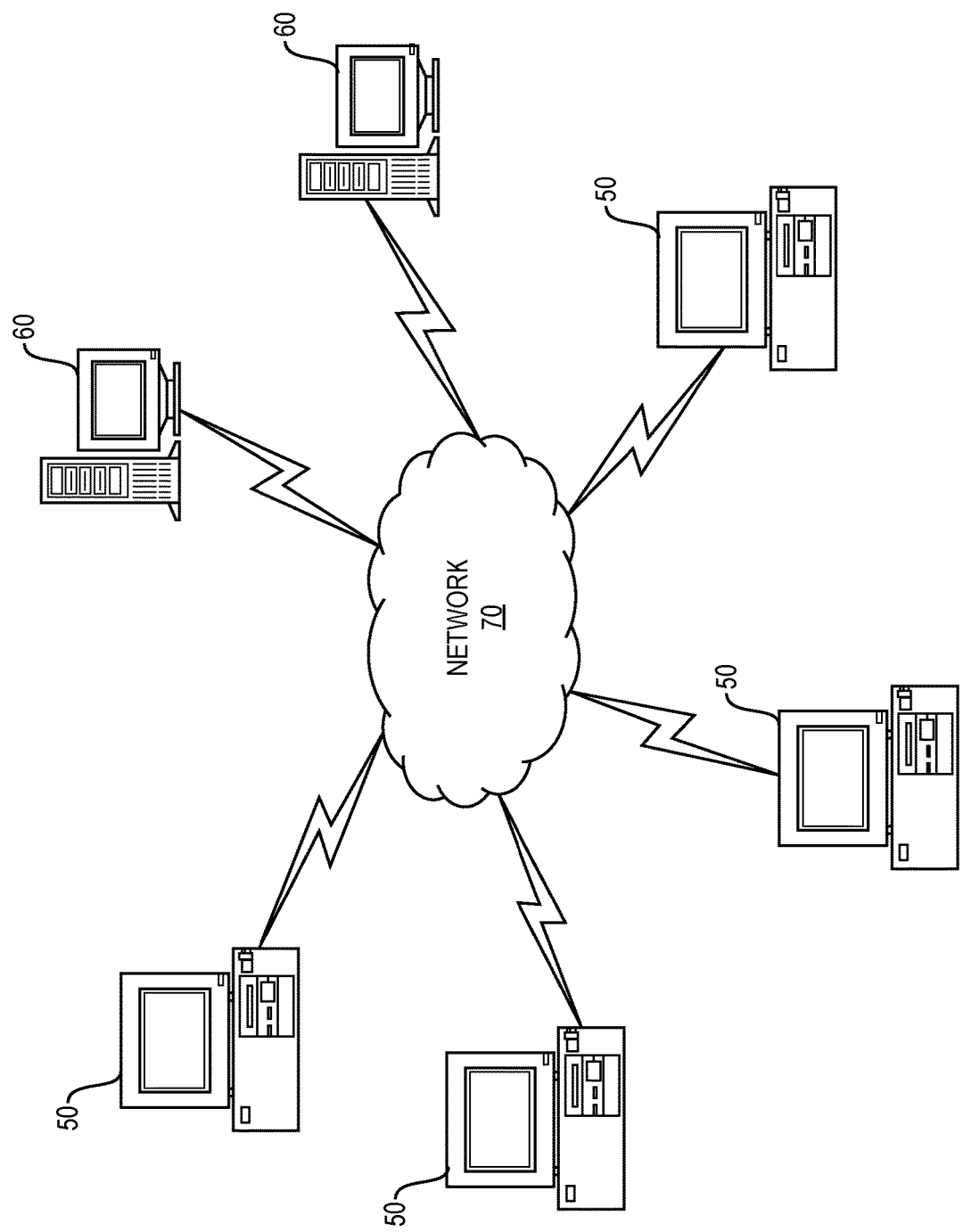
FIG. 11 illustrates a computer network or similar digital processing environment in which embodiments may be implemented.

FIG. 11 illustrates a computer network or similar digital processing environment in which embodiments of the present disclosure may be implemented.

Client computer(s)/device(s) 50 and server computer(s) 60 provide processing, storage, and input/output devices executing application programs and the like. The client computer(s)/devices 50 can also be linked through communications network 70 to other computing devices, including other client computer(s)/device(s) 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computer(s)/device(s) 50 and/or server computer(s) 60 may be configured, alone or in combination, to implement the embodiments described herein, e.g., the methods 400 and 600, among other examples. The server computer(s) 60 may not be separate server computers but part of communications network 70.

Figure 12:
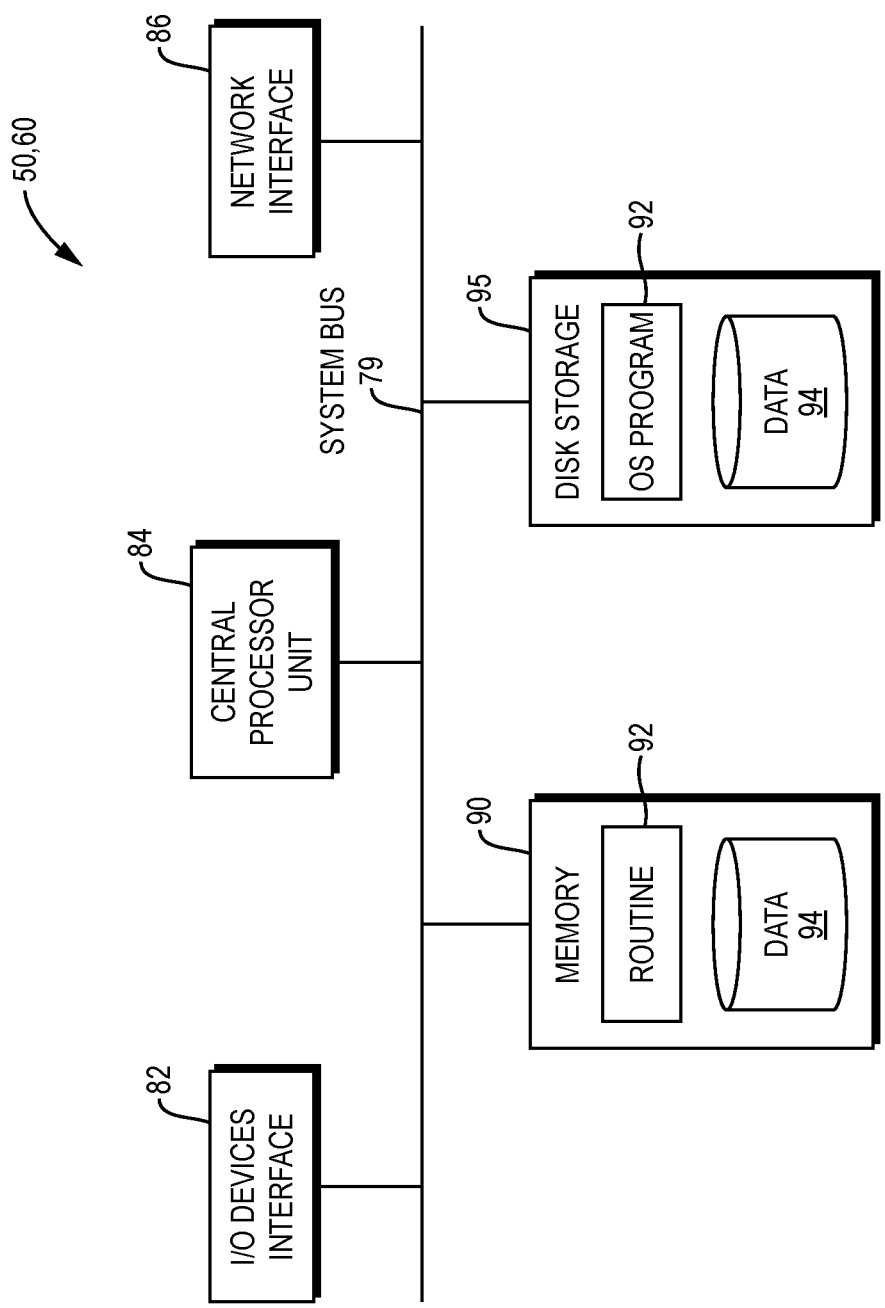
FIG. 12 is a diagram illustrating an example internal structure of a computer in the environment of FIG. 11.

FIG. 12 is a diagram of an example internal structure of a computer (e.g., client computer(s)/device(s) 50 or server computer(s) 60) in the computer system of FIG. 11. Each computer/device 50 and server computer 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) and enables the transfer of information between the elements. Attached to the system bus 79 is an input/output (I/O) device interface 82 for connecting various input and output devices (e.g., keyboard, mouse, displays, printers, speakers, etc.) to the computer/device 50 or server computer 60. A network interface 86 allows the computer/device 50 or server computer 60 to connect to various other devices attached to a network (e.g., communications network 70 of FIG. 11). Memory 90 provides volatile storage for computer software instructions 92 and data 94 used to implement an embodiment of the present disclosure (e.g., the methods 400 and 600, among others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An apparatus for rebooting an electronic device, the apparatus comprising:
 a communication interface configured to connect to a cloud management system;
 a data interface configured to connect to the electronic device;
 a first power port configured to receive power from a power source;
 a second power port configured to deliver power to the electronic device;
 a switch configured to connect the first power port to the second power port; and
 a processor configured to:
  receive, from the cloud management system, at least one configuration parameter;
  based on the received at least one configuration parameter, configure monitoring of data communications between the electronic device and a network point;
  via the data interface, conduct the configured monitoring of the data communications between the electronic device and the network point; and
  reboot the electronic device responsive to the configured monitoring.

2. The apparatus of claim 1, wherein the electronic device is a first electronic device, the communication interface is a first communication interface, and the apparatus further comprises:

a second communication interface configured to connect the apparatus to a control-device communicatively coupled to a second electronic device.

3. The apparatus of claim 2, wherein the processor is further configured to:
send a command to the control-device; and
receive data from the control-device.

4. The apparatus of claim 2, wherein the control-device is configured to:
perform one or more control operations of the second electronic device.

5. The apparatus of claim 1, wherein the configured monitoring includes testing connectivity through the electronic device to the network point.

6. The apparatus of claim 5, wherein the processor is further configured to reboot the electronic device responsive to the configured monitoring detecting a failure condition in the connectivity through the electronic device to the network point.

7. The apparatus of claim 1, wherein the electronic device is a first electronic device, the data interface is a first data interface, and the switch is a first switch, the apparatus further comprising:
a second data interface configured to connect to a second electronic device;
a third power port configured to deliver power to the second electronic device; and
a second switch configured to connect the first power port to the third power port; wherein:
the processor is further configured to conduct data communications monitoring of the second electronic device via the second data interface and to reboot the second electronic device responsive to the data communications monitoring of the second electronic device.

8. The apparatus of claim 7, wherein the reboot of the second electronic device is independent of the reboot of the first electronic device.

9. The apparatus of claim 1, wherein the data interface is configured to connect to the electronic device via at least one of: an Ethernet connection and a Wi-Fi connection.

10. The apparatus of claim 1, wherein the processor is further configured to reboot the electronic device by opening the switch and closing the switch following a backoff period.

11. The apparatus of claim 1, wherein the electronic device includes at least one of: a modem, a router, a network switch, a point-of-sale (POS) system, a server, an environment monitoring system (EMS), a network interface device (NID), a computing device, a software-defined wide area network (SDWAN) appliance, and an antenna.

12. The apparatus of claim 1, wherein the configured monitoring includes testing at least one of: access to an Internet server, access to a Domain Name System (DNS) server, accessing a uniform resource locator (URL), making an application programming interface (API) call, receiving an API call, sending data via an Internet protocol, and receiving data via an Internet protocol.

13. The apparatus of claim 1, wherein the communication interface is a cellular interface.

14. The apparatus of claim 1, wherein the processor is further configured to track reboot information for reporting via the communication interface to the cloud management system.

15. The apparatus of claim 1, wherein the communication interface is configured to enable wireless communications between the apparatus and the cloud management system.

16. The apparatus of claim 1, wherein the processor is further configured to reboot the electronic device in accordance with a user specified condition.

17. The apparatus of claim 1, wherein the processor is further configured to reboot the electronic device responsive to the configured monitoring identifying existence of a user specified condition.

18. An apparatus for controlling an electronic device, the apparatus comprising:
a communication interface configured to connect the apparatus to a cloud management system;
a data interface configured to connect to the electronic device; and
a processor configured to:
receive, from the cloud management system, (i) an indication of one or more control operations of the electronic device and (ii) at least one configuration parameter;
based on the received at least one configuration parameter, via the data interface, monitor data communications between the electronic device and a network point; and
perform the one or more control operations of the electronic device responsive to the data communications monitoring.

19. The apparatus of claim 18, wherein the one or more control operations include at least one of: executing a script, a reboot, reporting to the cloud management system, taking any preprogrammed action, and sending an impulse to the electronic device.

20. The apparatus of claim 18, wherein the indication of the one or more control operations is provided by a user via the cloud management system.

21. A method for rebooting an electronic device, the method comprising:
establishing a communication connection to the electronic device;
receiving at least one configuration parameter from a cloud management system;
configuring, based on the received at least one configuration parameter, monitoring of data communications between the electronic device and a network point;
via the established communication connection, conducting the configured monitoring of the data communications between the electronic device and the network point; and
rebooting the electronic device responsive to the configured monitoring.

22. A method for controlling an electronic device, the method comprising:
establishing a communication connection to a cloud management system;
communicating with the electronic device;
receiving, from the cloud management system, (i) an indication of one or more control operations of the electronic device and (ii) at least one configuration parameter;
based on the received at least one configuration parameter, monitoring data communications between the electronic device and a network point; and
performing the one or more control operations of the electronic device responsive to the data communications monitoring.

* * * * *